United States Patent
Dinh et al.

(10) Patent No.: US 10,950,009 B2
(45) Date of Patent: Mar. 16, 2021

(54) AI ENCODING APPARATUS AND OPERATION METHOD OF THE SAME, AND AI DECODING APPARATUS AND OPERATION METHOD OF THE SAME

(71) Applicant: SAMSUNG ELECTRONICS CO., LTD., Suwon-si (KR)

(72) Inventors: Quockhanh Dinh, Suwon-si (KR); Minseok Choi, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/743,618

(22) Filed: Jan. 15, 2020

(65) Prior Publication Data

US 2020/0151914 A1    May 14, 2020

Related U.S. Application Data

(63) Continuation of application No. 16/656,800, filed on Oct. 18, 2019.

(30) Foreign Application Priority Data

| Oct. 19, 2018 | (KR) | 10-2018-0125406 |
| Nov. 27, 2018 | (KR) | 10-2018-0148905 |

(Continued)

(51) Int. Cl.
*G06T 9/00* (2006.01)
*G06T 3/40* (2006.01)
(Continued)

(52) U.S. Cl.
CPC ............ *G06T 9/002* (2013.01); *G06K 9/6232* (2013.01); *G06K 9/6256* (2013.01); *G06N 3/02* (2013.01);
(Continued)

(58) Field of Classification Search
CPC . G06N 3/02–088; G06T 9/002; G06T 3/4046; G06T 2207/20081;
(Continued)

(56) References Cited

U.S. PATENT DOCUMENTS

| 7,308,031 B2 | 12/2007 | Yamaguchi et al. |
| 7,400,588 B2 | 7/2008 | Izzat et al. |

(Continued)

FOREIGN PATENT DOCUMENTS

| JP | 2008-527810 A | 7/2008 |
| JP | 2009540625 A | 11/2009 |

(Continued)

OTHER PUBLICATIONS

Jiang, Feng, et al. "An end-to-end compression framework based on convolutional neural networks." IEEE Transactions on Circuits and Systems for Video Technology 28.10 (2017): 3007-3018. (Year: 2017).*

(Continued)

*Primary Examiner* — Geoffrey E Summers
(74) *Attorney, Agent, or Firm* — Sughrue Mion, PLLC

(57) ABSTRACT

Provided is an artificial intelligence (AI) decoding apparatus including a memory storing one or more instructions; and a processor configured to execute the one or more instructions to, when an image is input to a second DNN including a plurality of layers, obtain first result values based on an operation between the image and a first filter kernel and obtain second result values based on an operation between the image and a second filter kernel, from a first layer including the first and second filter kernels from among the plurality of layers, perform normalization by transforming the first result values into first values by using a first scale factor, and, perform normalization by transforming the second result values into second values by using a second scale (Continued)

factor, transform the first values and the second values into integer values included in a preset range.

30 Claims, 21 Drawing Sheets

(30) Foreign Application Priority Data

| | | |
|---|---|---|
| Apr. 8, 2019 | (KR) | 10-2019-0041100 |
| Jun. 28, 2019 | (KR) | 10-2019-0078344 |

(51) Int. Cl.
  *G06K 9/62* (2006.01)
  *H04N 19/85* (2014.01)
  *G06N 3/02* (2006.01)
(52) U.S. Cl.
  CPC .......... *G06T 3/4046* (2013.01); *H04N 19/85* (2014.11); *G06T 2207/20081* (2013.01); *G06T 2207/20084* (2013.01)
(58) Field of Classification Search
  CPC ........ G06T 2207/20084; G06K 9/6232; G06K 9/6256; H04N 19/85
  USPC ................................ 382/232, 233, 156–158
  See application file for complete search history.

(56) References Cited

U.S. PATENT DOCUMENTS

| | | | |
|---|---|---|---|
| 8,184,164 | B2 | 5/2012 | Yang et al. |
| 9,251,572 | B2 | 2/2016 | Shu et al. |
| 9,679,213 | B2 | 6/2017 | Yang et al. |
| 9,892,344 | B1* | 2/2018 | Tran .................... G06K 9/66 |
| 10,148,723 | B2 | 12/2018 | Falvo |
| 10,218,971 | B2 | 2/2019 | Dong et al. |
| 2007/0189392 | A1 | 8/2007 | Tourapis et al. |
| 2012/0230604 | A1 | 9/2012 | Yamajo et al. |
| 2014/0177706 | A1 | 6/2014 | Fernandes et al. |
| 2015/0256828 | A1 | 9/2015 | Dong et al. |
| 2016/0360155 | A1 | 12/2016 | Civanlar et al. |
| 2017/0208345 | A1 | 7/2017 | Jeong et al. |
| 2017/0287109 | A1 | 10/2017 | Tasfi |
| 2017/0347061 | A1 | 11/2017 | Wang et al. |
| 2018/0107925 | A1 | 4/2018 | Choi et al. |
| 2018/0139458 | A1 | 5/2018 | Wang et al. |
| 2018/0174275 | A1 | 6/2018 | Bourdev et al. |
| 2018/0176570 | A1 | 6/2018 | Rippel et al. |
| 2018/0249158 | A1 | 8/2018 | Huang et al. |
| 2018/0288440 | A1 | 10/2018 | Chao |
| 2018/0293706 | A1 | 10/2018 | Viswanathan et al. |
| 2018/0302456 | A1 | 10/2018 | Katsavounidis et al. |
| 2019/0013822 | A1 | 1/2019 | Marpe et al. |
| 2019/0102640 | A1 | 4/2019 | Balasubramanian |
| 2019/0230354 | A1 | 7/2019 | Kim |
| 2020/0053408 | A1 | 2/2020 | Park et al. |
| 2020/0097806 | A1 | 3/2020 | Chen et al. |

FOREIGN PATENT DOCUMENTS

| | | |
|---|---|---|
| JP | 2012-191250 A | 10/2012 |
| KR | 10-0224801 B1 | 10/1999 |
| KR | 10-0286443 B1 | 4/2001 |
| KR | 10-2014-0145560 A | 12/2014 |
| KR | 10-2016-0036662 A | 4/2016 |
| KR | 10-2016-0080929 A | 7/2016 |
| KR | 10-2017-0059040 A | 5/2017 |
| KR | 10-2017-0100045 | 9/2017 |
| KR | 10-2018-0001428 | 1/2018 |
| KR | 10-2018-0043154 A | 4/2018 |
| KR | 10-2018-0052651 A | 5/2018 |
| KR | 10-1885855 | 8/2018 |
| KR | 10-2018-0100976 | 9/2018 |
| KR | 10-2018-0108288 A | 10/2018 |
| KR | 10-2022648 | 9/2019 |
| WO | 2017/036370 A1 | 3/2017 |
| WO | 2018/143992 A1 | 8/2018 |
| WO | 2018/214913 A1 | 11/2018 |

OTHER PUBLICATIONS

Ioffe, Sergey, and Christian Szegedy. "Batch Normalization: Accelerating Deep Network Training by Reducing Internal Covariate Shift." International Conference on Machine Learning. 2015. (Year: 2015).*
Guo, Yunhui. "A survey on methods and theories of quantized neural networks." arXiv preprint arXiv:1808.04752v1 (2018). (Year: 2018).*
Pedamonti, Dabal. "Comparison of non-linear activation functions for deep neural networks on MNIST classification task." arXiv preprint arXiv:1804.02763 (2018). (Year: 2018).*
Kim, Jaehwan, et al. "Dynamic frame resizing with convolutional neural network for efficient video compression." Applications of Digital Image Processing XL. vol. 10396. International Society for Optics and Photonics, 2017. (Year: 2017).*
Afonso, Mariana, Fan Zhang, and David R. Bull. "Spatial resolution adaptation framework for video compression." Applications of Digital Image Processing XLI. vol. 10752. International Society for Optics and Photonics, 2018. (Year: 2018).*
Choi, Jungwook, et al. "Pact: Parameterized clipping activation for quantized neural networks." arXiv preprint arXiv:1805.06085 (2018). (Year: 2018).*
Rastegari et al., "XNOR-Net: ImageNet Classification Using Binary Convolutional Neural Networks", Sep. 17, 2019, pp. 1-17, 17 pages total.
Courbariaux et al., "BinaryConnect: Training Deep Neural Networks with binary weights during propagations", Apr. 18, 2016, pp. 1-9, 9 pages total.
International Search Report and Written Opinion dated Dec. 4, 2019, in the corresponding International Patent Application No. PCT/KR2019/010645 [PCT/ISA/220], [PCT/ISA/210] and [PCT/ISA/237].
Communication (PCT/ISA/220, PCT/ISA/210 & PCT/ISA/237) dated Jan. 23, 2020 by the International Searching Authority in counterpart International Patent Application No. PCT/KR2019/012836.
Communication (PCT/ISA/220, PCT/ISA/210 & PCT/ISA/237) dated Jan. 29, 2020 by the International Searching Authority in counterpart International Patent Application No. PCT/KR2019/013595.
Communication (PCT/ISA/220, PCT/ISA/210 & PCT/ISA/237) dated Jan. 30, 2020 by the International Searching Authority in counterpart International Patent Application No. PCT/KR2019/013421.
Communication (PCT/ISA/220, PCT/ISA/210 & PCT/ISA/237) dated Feb. 5, 2020 by the International Searching Authority in counterpart International Patent Application No. PCT/KR2019/013483.
Communication (PCT/ISA/220, PCT/ISA/210 & PCT/ISA/237) dated Feb. 21, 2020 by the International Searching Authority in counterpart International Patent Application No. PCT/KR2019/013733.
Jeong, Woojin et al., "Efficient Super-Resolution Method for Single Image based on Deep Neural Networks", Journal of the Institute of Electronics and Information Engineers, vol. 55, No. 6, pp. 779-786, Jun. 2018. (10 pages total).
Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).
Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).

(56) References Cited

OTHER PUBLICATIONS

International Search Report and Written Opinion (PCT/ISA/210 and PCT/ISA/237), dated Jan. 7, 2020 by International Searching Authority in International Application No. PCT/KR2019/012510.

Sehwan Ki et al. "A Study on the Convolution Neural Network based on Blind High Dynamic Range Image Quality Assessment" The Journal of Korean Institute of Communications and Information Sciences, Jan. 2018, (5 pages total).

Patrick Le Callet et al. "A Convolutional Neural Network Approach for Objective Video Quality Assessment" IEEE Transactions on Neural Networks, vol. 17, No. 5, Sep. 2006, (14 pages).

Michalis Giannopoulos et al. "Convolutional Neural Networks for Video Quality Assessment" Sep. 26, 2018, [retrieved from https://arxiv.org/abs/1809.10117v1] (14 pages total).

International Search Report and Written Opinion (PCT/ISA/210 and PCT/ISA/237), dated Aug. 6, 2019 by International Searching Authority in International Application No. PCT/KR2019/004171.

International Search Report and Written Opinion (PCT/ISA/210 and PCT/ISA/237), dated Jan. 22, 2020 by International Searching Authority in International Application No. PCT/KR2019/013344.

Gupta et al., "Deep Learning with Limited Numerical Precision", Feb. 9, 2015, 10 pages.

Judd et al., "Reduced-Precision Strategies for Bounded Memory in Deep Neural Nets", Under review as a conference paper at ICLR 2016, Jan. 8, 2016, 12 pages.

Dettmers, Tim, "8-Bit Approximations for Parallelism in Deep Learning", Published as a conference paper at ICLR 2016, Feb. 19, 2016, 14 pages.

Lin et al., "Overcoming Challenges in Fixed Point Training of Deep Convolutional Networks", Jul. 8, 2016, 5 pages.

Nick Johnston et al. "Improved Lossy Image Compression with Priming and Spatially Adaptive Bitrates for Recurrent Networks" Cornell University, retrieved from [https://arxiv.org/abs/1703.10114], Mar. 29, 2017, (9 pages total).

Communication dated Dec. 22, 2020, issued by the Korean Intellectual Property Office in corresponding Korean Application No. 10-2019-0066057.

Communication dated Dec. 11, 2020, issued by the Korean Intellectual Property Office in corresponding Korean Application No. 10-2019-0041109.

Communication dated Dec. 16, 2020, issued by the Korean Intellectual Property Office in corresponding Korean Application No. 10-2019-0062583.

Seunghyun Cho et al. "A Technical Analysis on Deep Learning based Image and Video Compression" JBE vol. 23, No. 3, May 2018 (12 pages total).

Communication dated Dec. 10, 2020, issued by the Korean Intellectual Property Office in corresponding Korean Application No. 10-2019-0041102.

Communication dated Jan. 5, 2021 issued by the Korean Intellectual Property Office in Korean Application No. 10-2019-0076569.

Communication dated Jan. 6, 2021 issued by the Korean Intellectual Property Office in Korean Application No. 10-2019-0077250.

Christos Louizos, et al., "Relaxed Quantization for Discretized Neural Networks", Cornell University, Oct. 3, 2018. pp. 1-14.

Jiwon Kim, et al., "Deeply-Recursive Convolutional Network for Image Super-Resolution", Cornell University, Nov. 11, 2016, pp. 1-9.

Suo Qiu, et al., "FReLU: Flexible Rectified Linear Units for Improving Convolutional Neural Networks", Cornell University, Jan. 29, 2018, pp. 1-6.

Vivienne Sze, et al., "Efficient Processing of Deep Neural Networks: A Tutorial and Survey", Cornell University, Aug. 13, 2017, pp. 1-32.

Communication dated Jan. 12, 2021, issued by the Korean Intellectual Property Office in corresponding Korean Application No. 10-2019-0078343.

Communication dated Jan. 13, 2021, issued by the Korean Intellectual Property Office in corresponding Korean Application No. 10-2019-0078344.

Communication dated Nov. 23, 2020, issued by the Korean Intellectual Property Office in corresponding Korean Application No. 10-2019-0135604.

Communication (PCT/ISA/220, PCT/ISA/210 & PCT/ISA/237) dated Jan. 25, 2021 by the International Searching Authority in counterpart International Patent Application No. PCT/KR2020/015136.

\* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 17
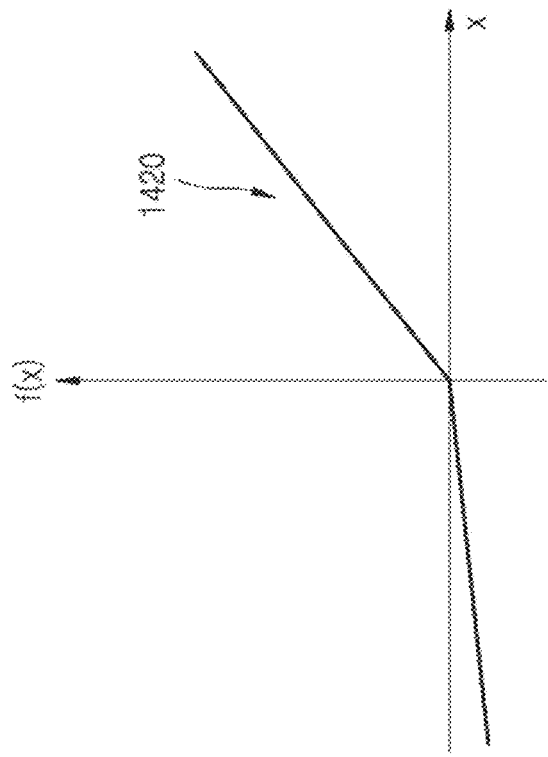
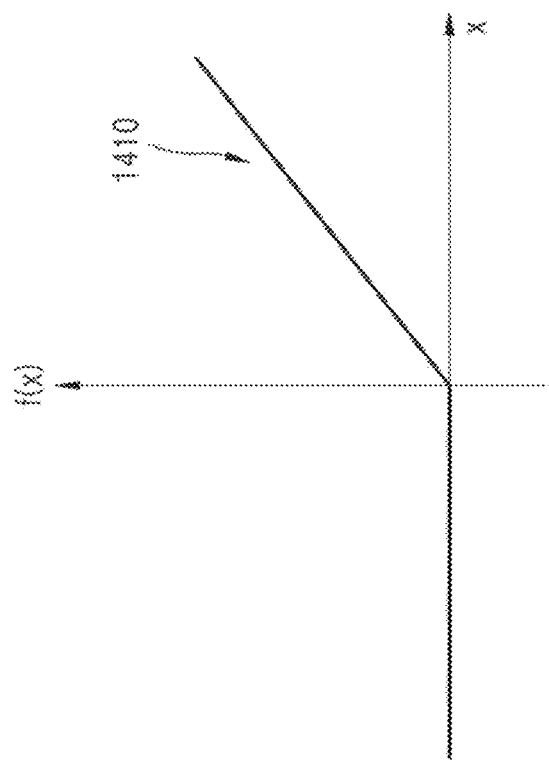

AI ENCODING APPARATUS AND OPERATION METHOD OF THE SAME, AND AI DECODING APPARATUS AND OPERATION METHOD OF THE SAME

CROSS-REFERENCE TO RELATED APPLICATIONS

This application is a continuation application of U.S. application Ser. No. 16/656,800, filed on Oct. 18, 2019, which is based on and claims priority under 35 U.S.C. § 119 to Korean Patent Application No. 10-2018-0125406, filed on Oct. 19, 2018, Korean Patent Application No. 10-2018-0148905, filed on Nov. 27, 2018, Korean Patent Application No. 10-2019-0041100, filed on Apr. 8, 2019, and Korean Patent Application No. 10-2019-0078344, filed on Jun. 28, 2019, in the Korean Intellectual Property Office, the disclosures of which are incorporated by reference herein in their entireties.

BACKGROUND

1. Field

The disclosure relates to an artificial intelligence (AI) encoding apparatus including a deep neural network (DNN) for AI-downscaling an image and an operation method of the AI encoding apparatus and an AI decoding apparatus including a DNN for AI-upscaling an image and an operation method of the AI decoding apparatus, and more particularly, to an AI encoding apparatus for reducing the amounts of memory and calculation necessary for performing a convolution operation in a plurality of convolution layers included in a DNN and an operation method of the AI encoding apparatus, and an AI decoding apparatus for reducing the amounts of memory and calculation necessary for performing a convolution operation in a plurality of convolution layers included in a DNN and an operation method of the AI decoding apparatus.

2. Description of the Related Art

Image data is encoded by a codec complying with a designated data compression standard, e.g., a moving picture expert group (MPEG) compression standard, and is then stored in a recording medium or is transmitted via a communication channel in the form of bitstreams.

As hardware for reproducing and storing high-resolution/high-quality images is being developed and supplied, a need for a codec capable of effectively encoding and decoding high-resolution/high-quality images is increasing.

A convolution neural network (CNN) may include one or more convolution layers, in each of which a convolution operation may be performed on input data and weights included in a kernel.

The CNN requires a large amount of memory to store intermediate result values that are output between convolution layers. In the CNN, low-precision transformation may be performed to reduce the amount of memory required. When low-precision transformation is performed, a transformation error may occur, and thus, a method of minimizing this transformation error is needed.

SUMMARY

Provided are an AI decoding apparatus capable of minimizing a transformation error when expressing, with low precision, intermediate result values generated in a second DNN included in the AI decoding apparatus, and an operation method of the AI decoding apparatus.

Additional aspects will be set forth in part in the description which follows and, in part, will be apparent from the description, or may be learned by practice of the presented embodiments of the disclosure.

According to embodiments of the disclosure, an AI decoding apparatus includes a memory storing one or more instructions, and a processor configured to execute the stored one or more instructions to: obtain image data a first image that is obtained by downscaling an original image by using a first deep neural network (DNN), generate a second image as a reconstructed image of the first image, based on the image data, input the second image to a second DNN comprising a plurality of layers comprising a first layer and a second layer, the first layer comprising a first filter kernel and a second filter kernel, obtain first result values based on an operation between the second image and the first filter kernel, and obtain second result values based on an operation between the second image and the second filter kernel, perform normalization by transforming the first result values into first values by using a first scale factor, and perform normalization by transforming the second result values into second values by using a second scale factor, transform the first values and the second values into integer values included in a preset range, and input the integer values to the second layer, obtain third result values based on the integer values in the second layer, and obtain a third image by upscaling the second image, based on the third result values, wherein the first scale factor and the second scale factor are set in association with scale factors of the first DNN.

The second DNN may be a network trained in connection with the first DNN, based on an image obtained during training of the first DNN, and the first scale factor and the second scale factor may be set via training of the second DNN and the first DNN.

The first scale factor and the second scale factor may be trained such that a normal distribution of the first values becomes equal to a normal distribution of the second values.

The processor may be further configured to clip the first values and the second values to the preset range and transform the clipped first and second values into the integer values.

The processor may be further configured to transform the clipped values into integer values by rounding off the clipped values.

The processor may be further configured to store the integer values in the memory.

A size of the memory that stores the integer values may be determined based on the preset range.

The processor may be further configured to generate a first feature map by performing a convolution operation between the second image and the first filter kernel, and obtain the first result values by applying a first activation function to the first feature map. The processor may be further configured to generate a second feature map by performing a convolution operation between the second image and the second filter kernel, and obtain the second result values by applying a second activation function to the second feature map.

The first activation function and the second activation function are expressed as $$f(x) = \begin{cases} ax, & x < 0 \\ bx, & x \geq 0, \end{cases}$$

wherein f(x) denotes the first activation function or the second activation function, a and b denote slopes that have different values, and wherein a value of b is determined via training of the second DNN.

The value of b in the first activation function may be different from the value of b in the second activation function.

According to embodiments of the disclosure, an AI encoding apparatus includes a memory storing one or more instructions; and a processor configured to execute the stored one or more instructions to: input an original image to a first deep neural network (DNN) comprising a plurality of layers comprising a first layer and a second layer, the first layer comprising a first filter kernel and a second filter kernel, obtain first result values based on an operation between the original image and the first filter kernel, and obtain second result values based on an operation between the original image and the second filter kernel, perform normalization by transforming the first result values into first values by using a first scale factor, and perform normalization by transforming the second result values into second values by using a second scale factor, transform the first values and the second values into integer values included in a preset range, input the integer values to the second layer, obtain third result values based on the integer values in the second layer, and obtain a first image by downscaling the original image, based on the third result values, and encode the first image, wherein the first scale factor and the second scale factor are set in association with scale factors of a second DNN that is configured to upscale the first image.

The first DNN may be a network trained in connection with the second DNN, based on loss information that is obtained during training of the second DNN. The first scale factor and the second scale factor may be set via training of the second DNN and the first DNN.

The first DNN may be a network trained based on first loss information generated by AI downscaling during training of the first DNN and second loss information generated by AI upscaling during training of the second DNN.

The first scale factor and the second scale factor may be trained such that a normal distribution of the first values becomes equal to a normal distribution of the second values.

The processor may be further configured to clip the first values and the second values to the preset range and transform the clipped first and second values into the integer values.

The processor may be further configured to transform the clipped values into integer values by rounding off the clipped values.

The processor may be further configured to store the integer values in the memory.

A size of the memory that stores the integer values may be determined based on the preset range.

According to embodiments of the disclosure, an operation method of an AI decoding apparatus may include: obtaining image data corresponding to a first image that is obtained by downscaling an original image by using a first deep neural network (DNN); generating a second image as a reconstructed image of the first image, based on the image data; inputting the second image to a second DNN comprising a plurality of layers comprising a first layer and a second layer, the first layer comprising a first filter kernel and a second filter kernel; obtaining first result values based on an operation between the second image and the first filter kernel, and obtaining second result values based on an operation between the second image and the second filter kernel; performing normalization by transforming the first result values into first values by using a first scale factor, and performing normalization by transforming the second result values into second values by using a second scale factor; transforming the first values and the second values into integer values included in a preset range; inputting the integer values to the second layer, and obtaining third result values based on the integer values in the second layer; and obtaining a third image by upscaling the second image, based on the third result values, wherein the first scale factor and the second scale factor are set in association with scale factors of the first DNN According to embodiments of the disclosure, an operation method of an AI encoding apparatus may include: inputting an original image to a first deep neural network (DNN) comprising a plurality of layers comprising a first layer and a second layer, the first layer comprising a first filter kernel and a second filter kernel; obtaining first result values based on an operation between the original image and the first filter kernel and obtaining second result values based on an operation between the original image and the second filter kernel; performing normalization by transforming the first result values into first values by using a first scale factor, and performing normalization by transforming the second result values into second values by using a second scale factor; transforming the first values and the second values into integer values included in a preset range; inputting the integer values to the second layer, and obtaining third result values based on the integer values in the second layer; obtaining a first image by downscaling the original image, based on the third result values; and encoding the first image, wherein the first scale factor and the second scale factor are set in association with scale factors of the second DNN.

According to embodiments of the disclosure, an artificial intelligence (AI) decoding apparatus may include: a memory storing one or more instructions; and a processor configured to execute the stored one or more instructions to: receive a downscaled image that is downscaled by a first deep neural network (DNN), input the downscaled image to a first layer of a second deep neural network, obtain first values and second values from the first layer of the second DNN, the first values and the second values representing a first feature map and a second feature map of the downscaled image, respectively; perform a transformation operation on the first values and the second values by normalizing the first values and the second values based on a first scale factor and a second scale factor, respectively, and transforming the normalized first values and the normalized second values into integer values within a present range, input the integer values to a second layer of the second DNN, and obtain an upscaled image corresponding to the downscaled image, from the second layer of the second DNN, wherein the first scale factor and the second scale factor are set in association with scale factors of the first DNN.

According to embodiments of the disclosure, an artificial intelligence (AI) encoding apparatus may include: a memory storing one or more instructions; and a processor configured to execute the stored one or more instructions to: input an original image to a first layer of a first deep neural network (DNN), obtain first values and second values from the first layer of the first DNN, the first values and the second values representing a first feature map and a second feature map of the original image, respectively, perform a transformation operation on the first values and the second values by normalizing the first values and the second values based on a first scale factor and a second scale factor, respectively, and transforming the normalized first values and the normalized second values into integer values within a present range, input the integer values to a second layer of the first DNN to obtain a downscaled image, and transmit the downscaled image to a second DNN configured to upscale the downscaled image, wherein the first scale factor and the second scale factor are set in association with scale factors of a second DNN.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a table showing a mapping relationship between several pieces of image-related information and several pieces of DNN setting information;

FIG. 17 illustrates an activation function according to embodiments of the disclosure;

DETAILED DESCRIPTION

Figure 1:
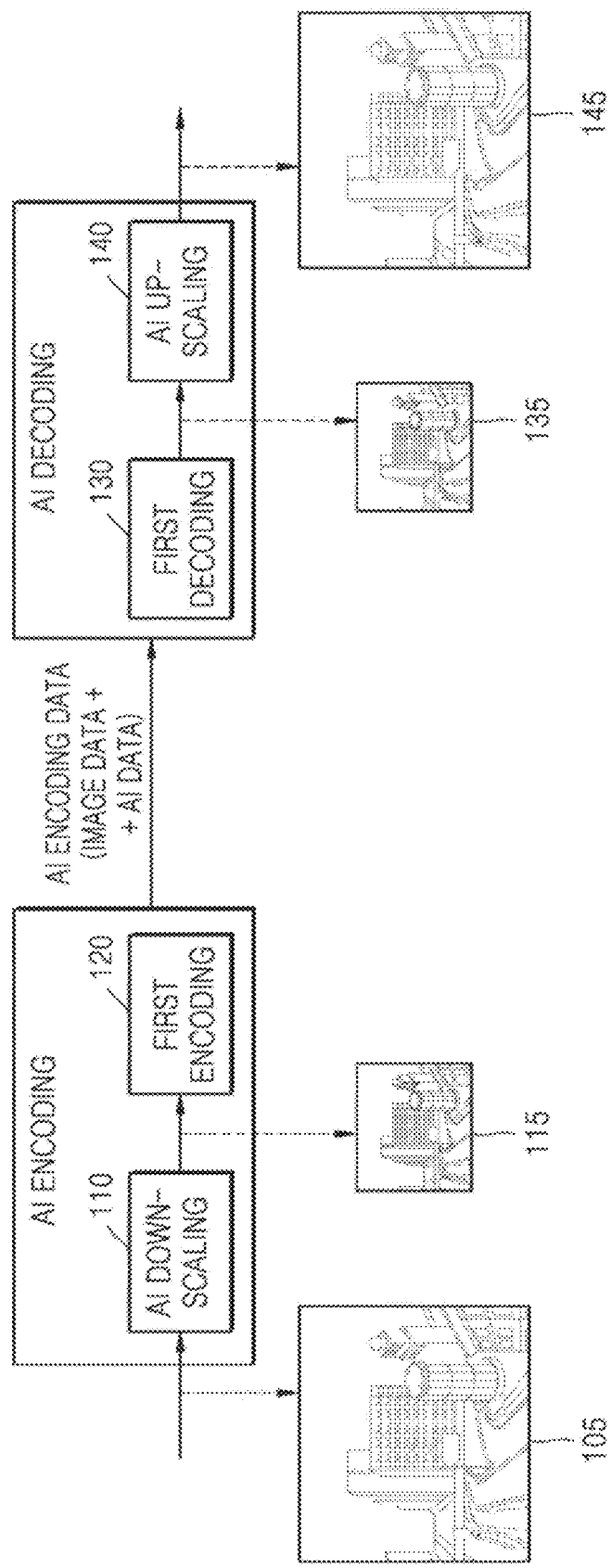
FIG. 1 is a diagram for describing an artificial intelligence (AI) encoding process and an AI decoding process, according to embodiments.

Embodiments of the disclosure provide apparatuses and methods for performing artificial intelligence (AI) encoding and AI decoding on an image, wherein an image is encoded and decoded based on AI to achieve a low bitrate and minimize a low-precision transformation error.

As the disclosure allows for various changes and numerous examples, embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

Expressions such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

FIG. 1 is a diagram for describing an AI encoding process and an AI decoding process, according to embodiments.

As described above, when resolution of an image remarkably increases, the throughput of information for encoding and decoding the image is increased, and accordingly, a method for improving efficiency of encoding and decoding of an image is required.

As shown in FIG. 1, according to embodiments of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding 120 and the first decoding 130 are performed on the original image 105.

In FIG. 1, the first image 115 is obtained by performing the AI down-scaling 110 on the original image 105 and the first encoding 120 is performed on the first image 115 during the AI encoding process, according to embodiments. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 is trained jointly with AI for the AI up-scaling 140 of the second image 135. This is because the AI down-scaling 110 and the AI up-scaling 120 have two competing objectives of scaling-down and scaling-up an image, and therefore when the AI for the AI down-scaling 110 and the AI for the AI up-scaling 140 are separately trained, a difference between the original image 105 that is an object of AI encoding and the third image 145 reconstructed through AI decoding is increased.

In embodiments of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to embodiments, the AI data may be transmitted separately from the image data, in a form of a frame or a packet. The AI data and the image data obtained as a result of the AI encoding may be transmitted through the same network or through different networks.

Figure 2:
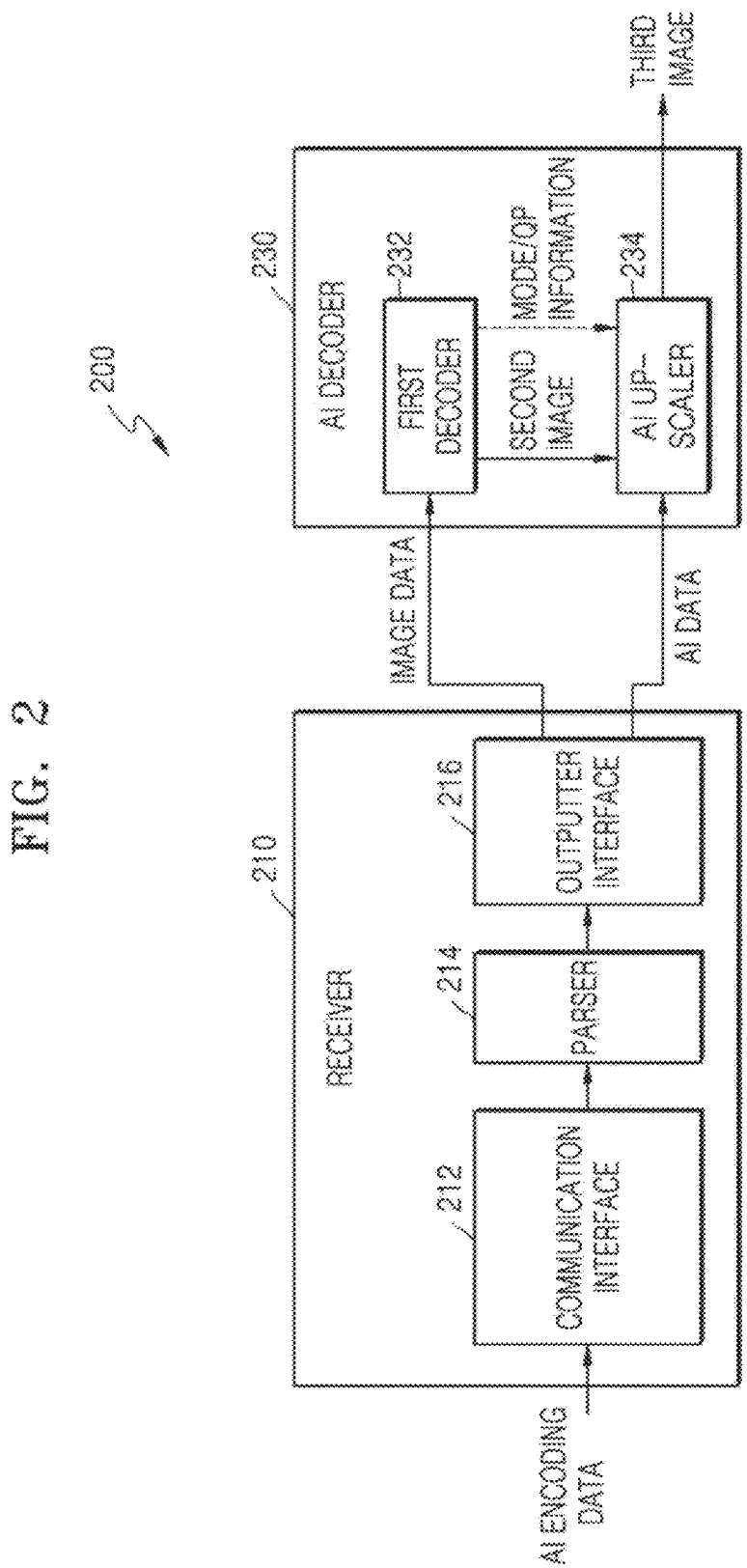
FIG. 2 is a block diagram of a configuration of an AI decoding apparatus according to embodiments.

FIG. 2 is a block diagram of a configuration of an AI decoding apparatus 100 according to embodiments.

Referring to FIG. 2, the AI decoding apparatus 200 according to embodiments may include a receiver 210 and an AI decoder 230. The receiver 210 may include a communication interface 212, a parser 214, and an output interface 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

The communication interface 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to embodiments, the parser 214 distinguishably transmits the image data and the AI data to the output interface 216 via the header of the data received through the communication interface 212, and the output interface 216 transmits the distinguished image data and AI data respectively to the first decoder 232 and the AI up-scaler 234. At this time, it may be verified that the image data included in the AI encoding data is image data generated via a codec (for example, MPEG-2, H.264 AVC, MPEG-4, HEVC, VC-1, VP8, VP9, or AV1). In this case, corresponding information may be transmitted to the first decoder 232 through the output interface 216 such that the image data is processed via the verified codec.

According to embodiments, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to embodiments, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to embodiments, the AI up-scaling may be performed by further using the first decoding related information, such as the prediction mode information, the quantization parameter information, or the like included in the image data.

The receiver 210 and the AI decoder 230 according to embodiments are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target corresponds to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about any one or any combination of a bitrate of the image data obtained as the result of performing first encoding on the first image 115 or a codec type used during the first encoding of the first image 115.

The AI up-scaler 234 may determine the up-scaling target of the second image 135, based on either one or both of the difference information, and the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
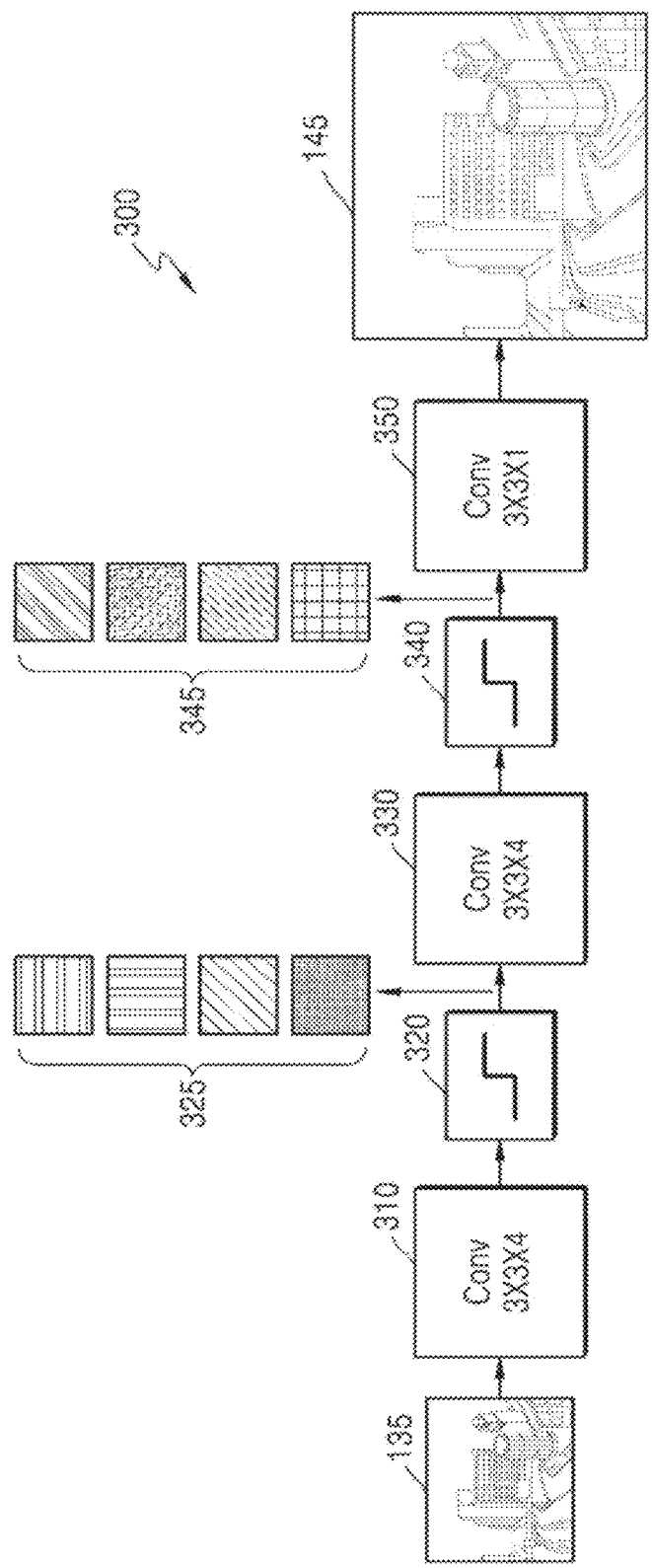
FIG. 3 is a diagram showing a second deep neural network (DNN) for performing AI up-scaling on a second image.
Figure 4:
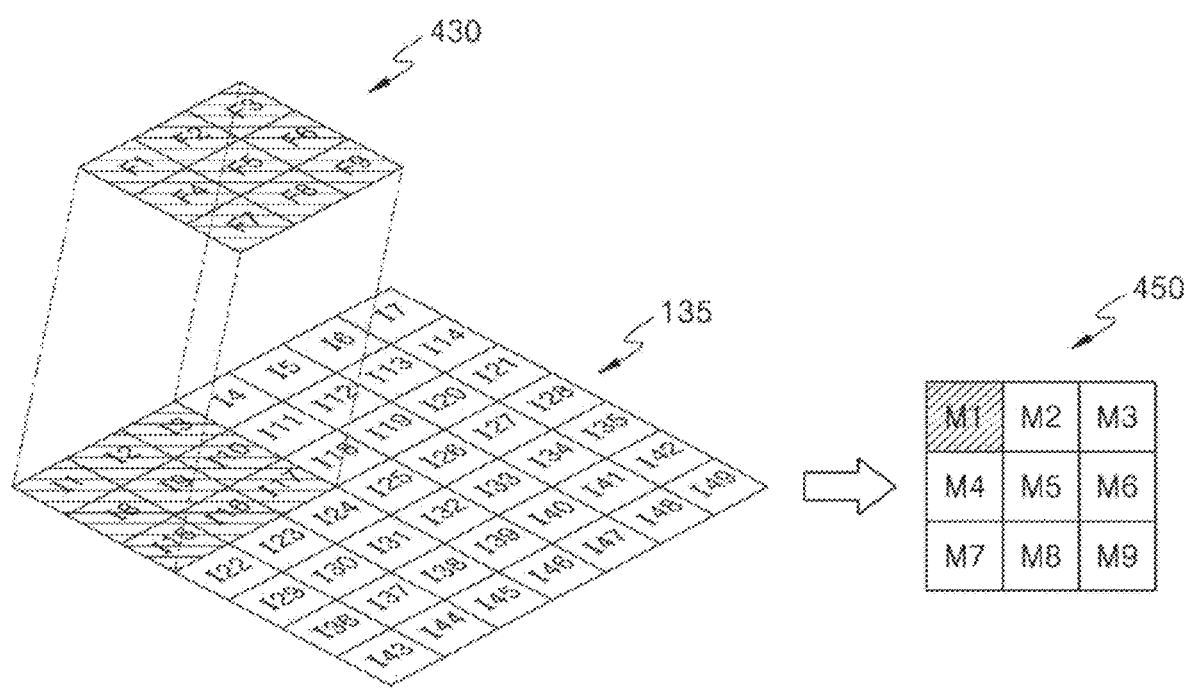
FIG. 4 is a diagram for describing a convolution operation by a convolution layer.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Four filter kernels are used in the first convolution layer 310, and four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to embodiments of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information may be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to embodiments. Also, according to embodiments, the second DNN 300 may be implemented as a recurrent neural network (RNN). In this case, a convolutional neural network (CNN) structure of the second DNN 300 according to embodiments of the disclosure is changed to an RNN structure.

According to embodiments, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to embodiments, the AI up-scaler 234 may store a plurality of pieces of DNN setting information settable in a second DNN.

Here, the DNN setting information may include information about any one or any combination of the number of convolution layers included in the second DNN, the number of filter kernels for each convolution layer, and a parameter of each filter kernel. The plurality of pieces of DNN setting information may respectively correspond to various up-scaling targets, and the second DNN may operate based on DNN setting information corresponding to an up-scaling target. The second DNN may have different structures based on the DNN setting information. For example, the second DNN may include three convolution layers based on any piece of DNN setting information, and may include four convolution layers based on another piece of DNN setting information.

According to embodiments, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Figure 6:
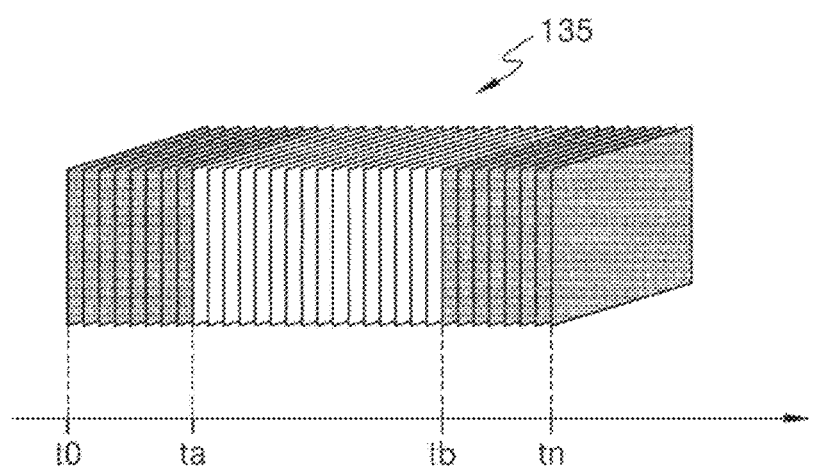
FIG. 6 is a diagram showing a second image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN.

In this regard, the AI up-scaler 234 may verify information of the first DNN. In order for the AI up-scaler 234 to verify the information of the first DNN, the AI decoding apparatus 200 according to embodiments receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

Parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to embodiments, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through embodiments according to FIG. 5, it will be determined that AI encoding and AI decoding processes according to embodiments of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element may be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on an image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to embodiments, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to embodiments, the AI data may include the DNN setting information. The AI up-scaler 234 may perform AI up-scaling on the second image 135 by using the DNN setting information after obtaining the DNN setting information included in the AI data.

According to embodiments, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to embodiments, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to embodiments, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to embodiments, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
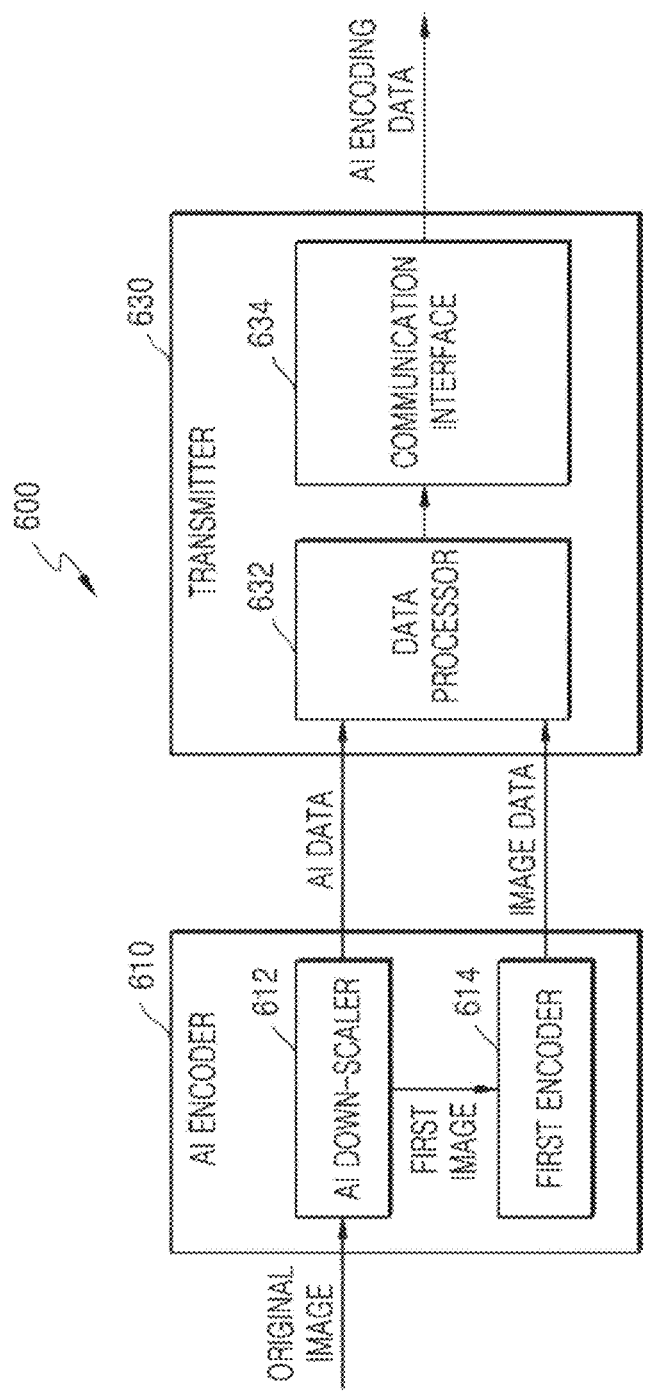
FIG. 7 is a block diagram of a configuration of an AI encoding apparatus according to embodiments.

FIG. 7 is a block diagram of a configuration of the AI encoding apparatus 600 according to embodiments.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communication interface 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing embodiments of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to embodiments, the AI data may include difference information between the original image 105 and the first image 115. Also, the AI data may include information related to the first image 115. The information related to the first image 115 may include information about any one or any combination of resolution of the first image 115, a bitrate of the image data obtained as the result of performing the first encoding on the first image 115, or a codec type used during the first encoding of the first image 115.

According to embodiments, the AI data may include an identifier of mutually agreed DNN setting information such that the AI up-scaling is performed on the second image 135 to the up-scaling target corresponding to the down-scaling target of the first DNN.

Also, according to embodiments, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to embodiments, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to embodiments, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes any one or any combination of the number of convolution layers included in the first DNN, the number of filter kernels for each convolution layer, and a parameter of each filter kernel.

The AI down-scaler 612 may set the first DNN with the DNN setting information obtained for performing the AI down-scaling on the original image 105 to obtain the first image 115 of a certain resolution and/or a certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to embodiments, the AI down-scaler 612 may determine the down-scaling target based on any one or any combination of a compression ratio (for example, a resolution difference between the original image 105 and the first image 115, target bitrate, or the like), compression quality (for example, type of bitrate), compression history information, and a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a threshold value (for example, average quality of the encoding quality that has been used more frequently than the threshold value), according to the compression history information.

As another example, the AI down-scaler 612 may determine the down-scaling target, based on the resolution, type (for example, a file format), or the like of the original image 105.

According to embodiments, when the original image 105 includes a plurality of frames, the AI down-scaler 612 may independently determine down-scaling target for a certain number of frames, or may determine down-scaling target for entire frames.

According to embodiments, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
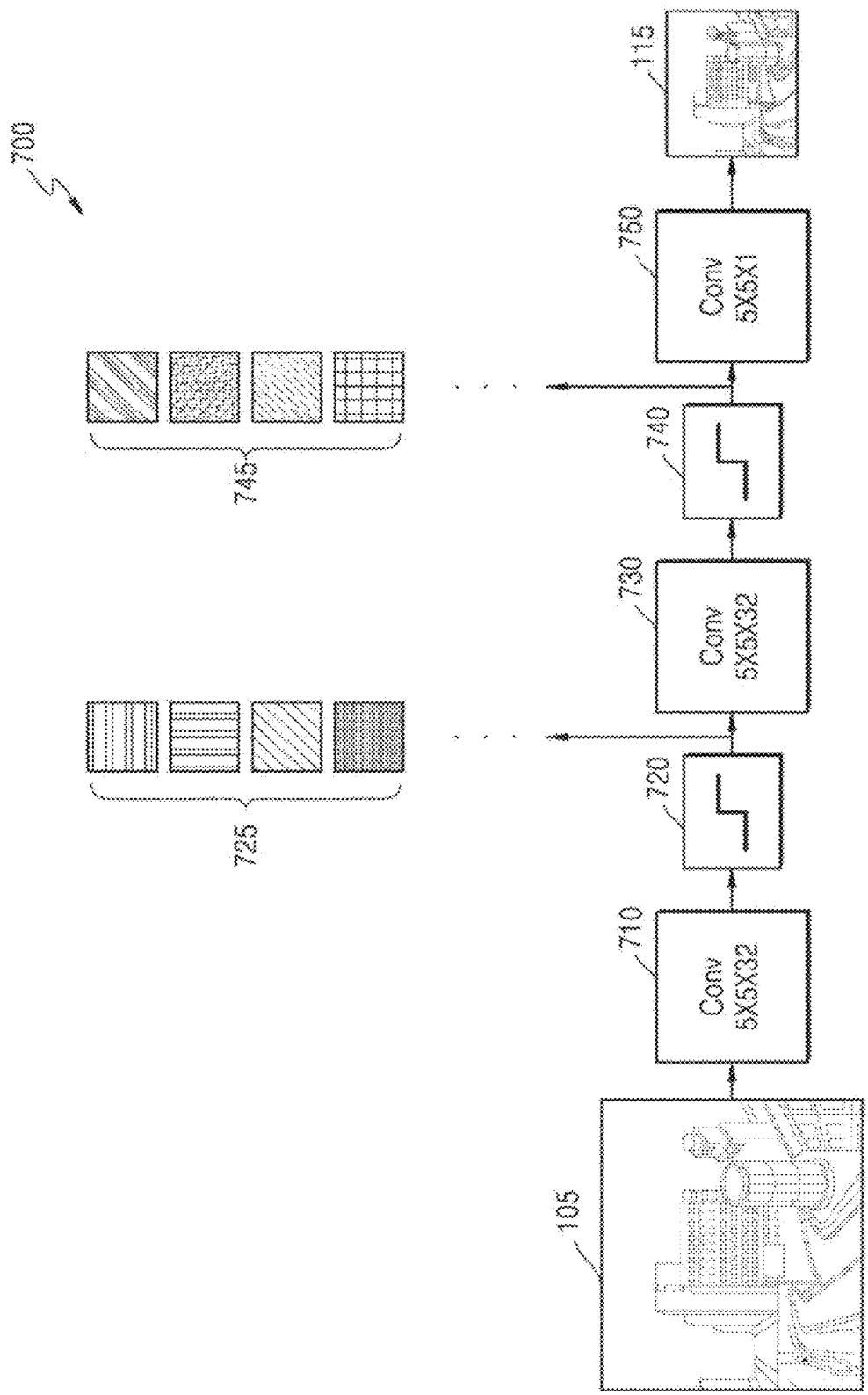
FIG. 8 is a diagram showing a first DNN for performing AI down-scaling on an original image.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to a second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to embodiments of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to embodiments. Also, according to embodiments, the first DNN 700 may be implemented as an RNN. In this case, a CNN structure of the first DNN 700 according to embodiments of the disclosure is changed to an RNN structure.

According to embodiments, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes either one or both of the AI data and the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communication interface 634. As another example, the data processor 632 may process the AI data to be expressed in a form of bitstream, and transmit each of a bitstream corresponding to the AI data and a bitstream corresponding to the image data through the communication interface 634. As another example, the data processor 632 may process the AI data to be expressed in a form of a frame or packet, and transmit the image data in a form of a bitstream and the AI data in a form of a frame or packet through the communication interface 634.

The communication interface 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to embodiments, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
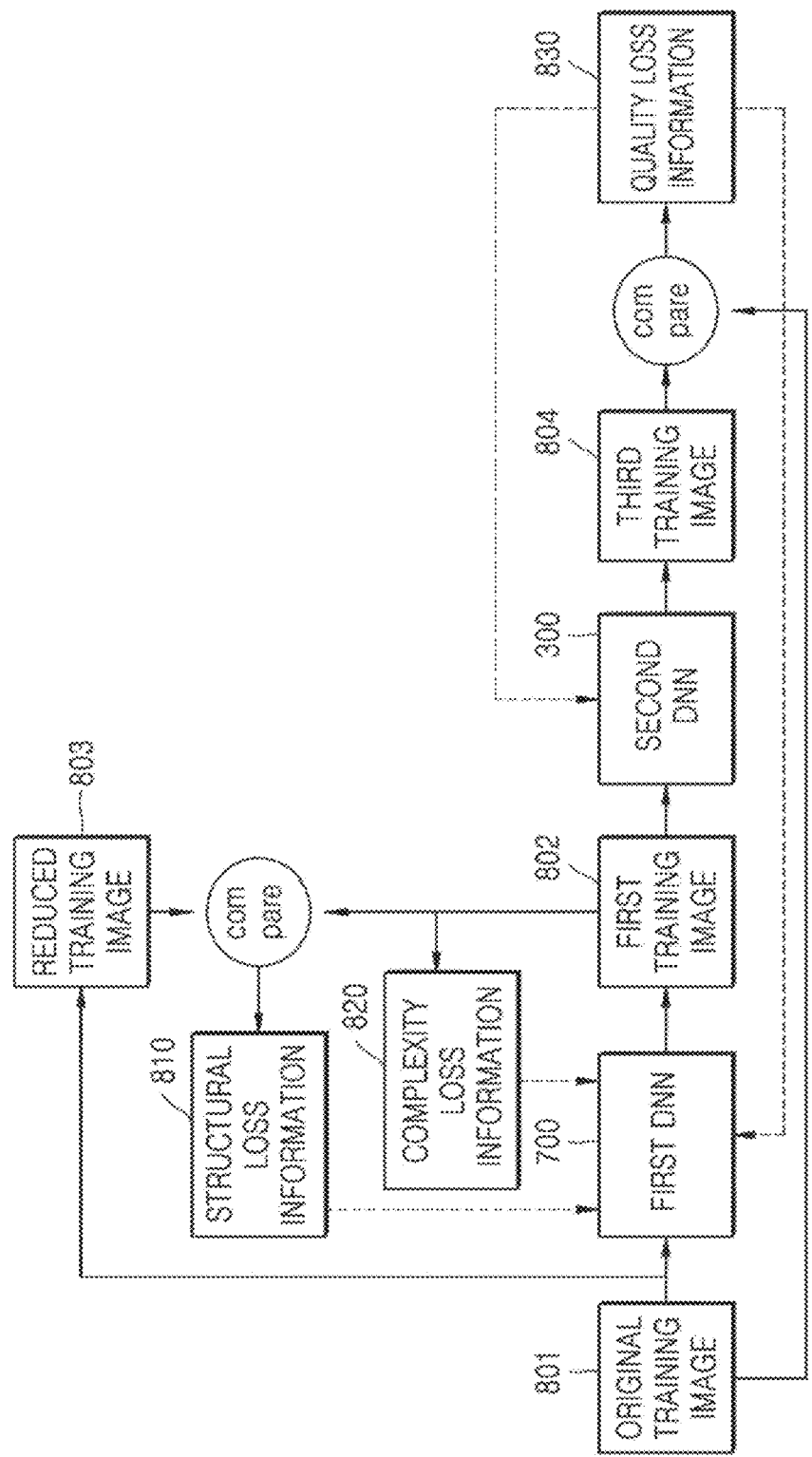
FIG. 9 is a diagram for describing a method of training a first DNN and a second DNN.

FIG. 9 is a diagram for describing a method of training the first DNN 700 and the second DNN 300.

In embodiments, the original image 105 on which AI encoding is performed is reconstructed to the third image 145 via an AI decoding process, and to maintain similarity between the original image 105 and the third image 145 obtained as a result of AI decoding, connectivity is established between the AI encoding process and the AI decoding process. In other words, information lost in the AI encoding process is reconstructed during the AI decoding process, and in this regard, the first DNN 700 and the second DNN 300 are jointly trained.

For accurate AI decoding, ultimately, quality loss information 830 corresponding to a result of comparing a third training image 804 and an original training image 801 shown in FIG. 9 may be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to embodiments, the original training image 801 may include a luminance image extracted from the still image or the moving image including the plurality of frames. Also, according to embodiments, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to embodiments, a second training image obtained as first encoding and first decoding are performed on the first training image 802 may be input to the second DNN 300. To input the second training image to the second DNN 300, any one codec among MPEG-2, H.264, MPEG-4, HEVC, VC-1, VP8, VP9, and AV1 may be used. Any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include any one or any combination of bilinear scaling, bicubic scaling, lanczos scaling, or stair step scaling.

To prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include any one or any combination of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, and a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{LossDS}=a\times\text{Structural loss information}+b\times\text{Complexity loss information}+c\times\text{Quality loss information}$$

$$\text{LossUS}=d\times\text{Quality loss information} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be predetermined weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on any one or any combination of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters based on the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

The parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
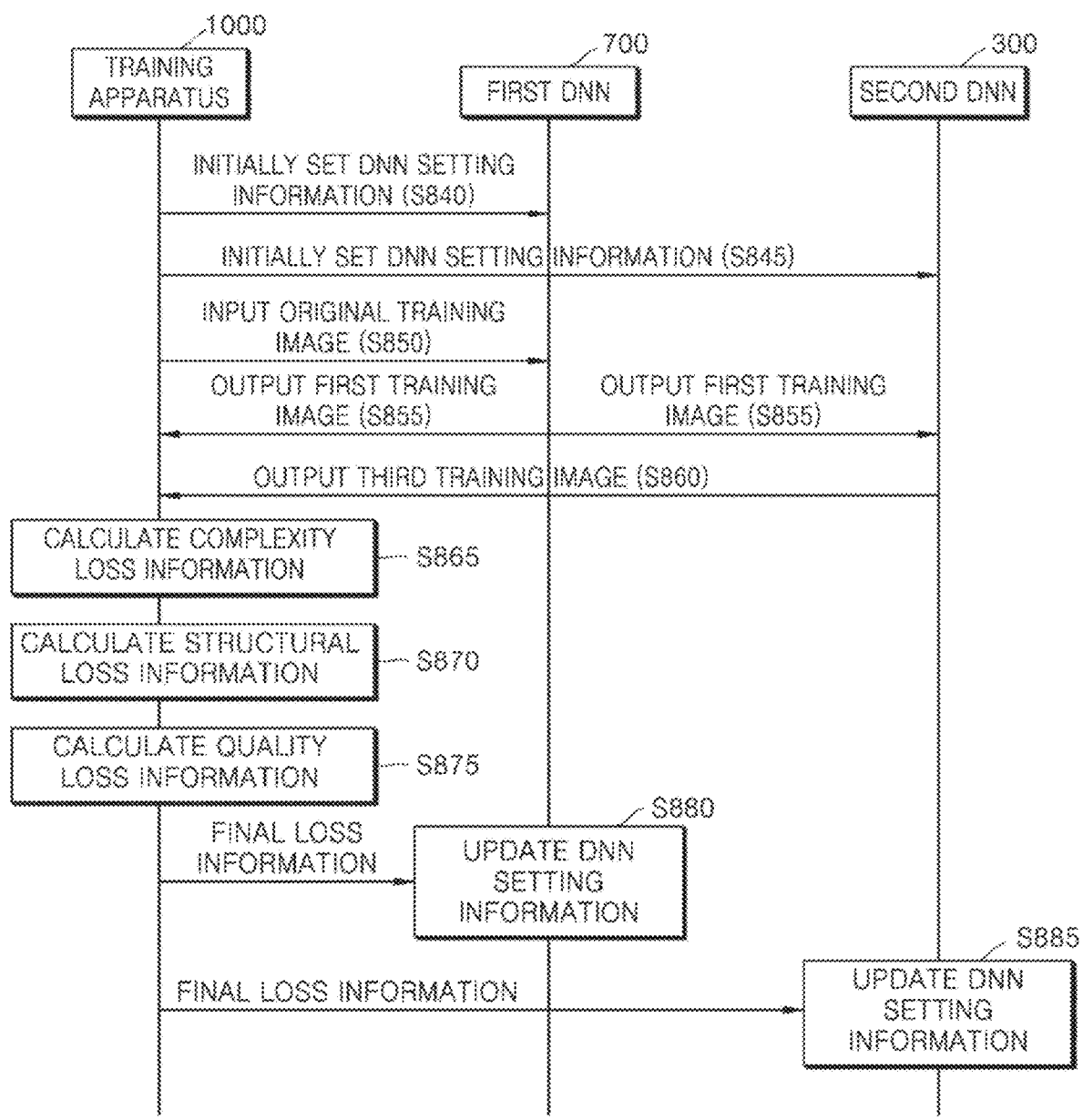
FIG. 10 is a diagram for describing a training process of a first DNN and a second DNN by a training apparatus.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about any one or any combination of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to embodiments of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to embodiments of the disclosure, is higher than subjective image quality when encoding and decoding are performed via HEVC, a bitrate is reduced by at least 50%.

Figure 11:
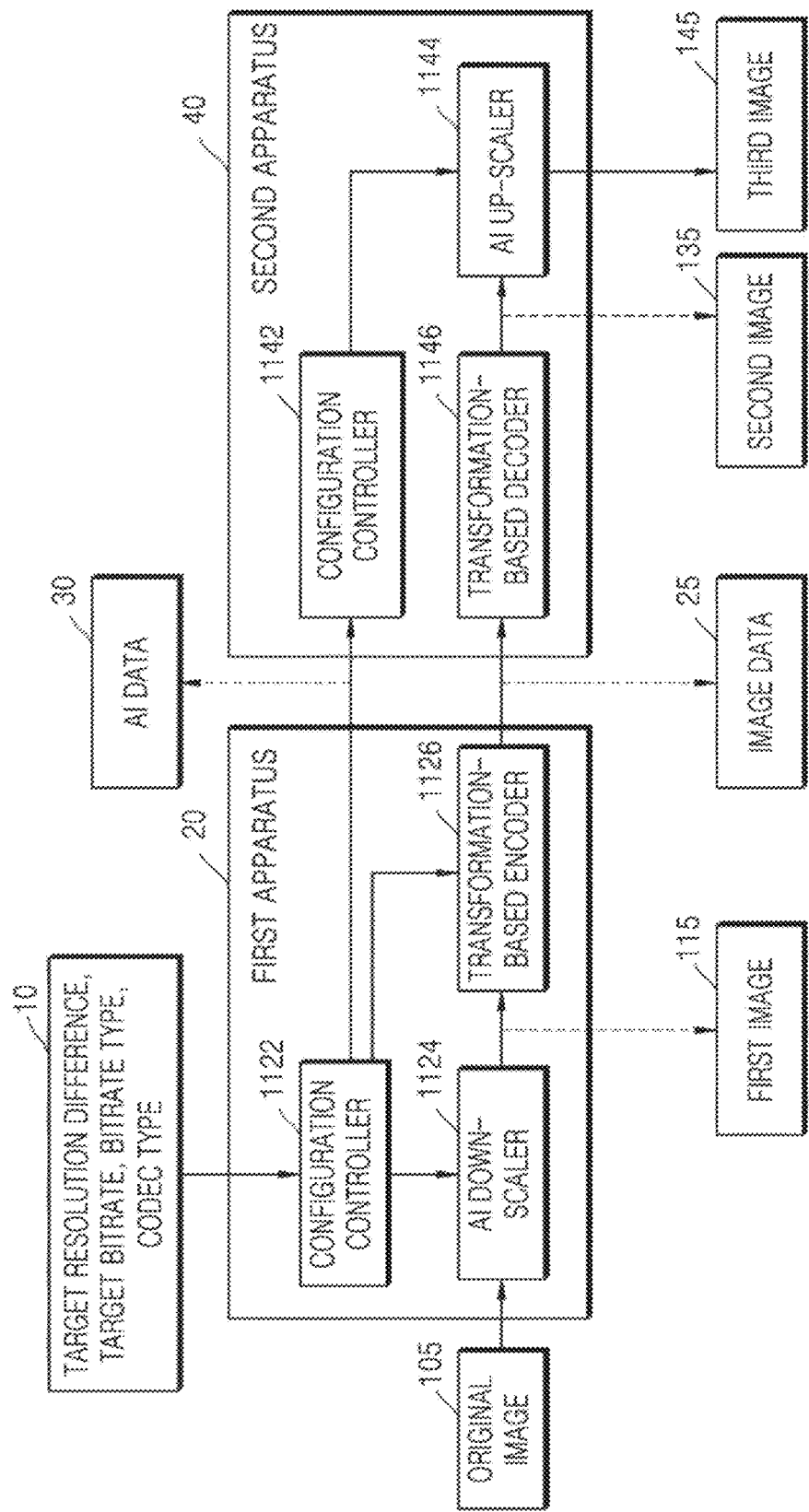
FIG. 11 is a diagram of an apparatus for performing AI down-scaling on an original image and an apparatus for performing AI up-scaling on a second image.

FIG. 11 is a diagram of a first apparatus 20 for performing AI down-scaling on the original image 105 and a second apparatus 40 for performing AI up-scaling on the second image 135.

The first apparatus 20 receives the original image 105 and provides image data 25 and AI data 30 to the second apparatus 40 by using an AI down-scaler 1124 and a transformation-based encoder 1126. According to embodiments, the image data 25 corresponds to the image data of FIG. 1 and the AI data 30 corresponds to the AI data of FIG. 1. Also, according to embodiments, the transformation-based encoder 1126 corresponds to the first encoder 614 of FIG. 7 and the AI down-scaler 1124 corresponds to the AI down-scaler 612 of FIG. 7.

The second apparatus 40 receives the AI data 30 and the image data 25 and obtains the third image 145 by using a transformation-based decoder 1146 and an AI up-scaler 1144. According to embodiments, the transformation-based decoder 1146 corresponds to the first decoder 232 of FIG. 2 and the AI up-scaler 1144 corresponds to the AI up-scaler 234 of FIG. 2.

According to embodiments, the first apparatus 20 includes a CPU, a memory, and a computer program including instructions. The computer program is stored in the memory. According to embodiments, the first apparatus 20 performs functions to be described with reference to FIG. 11 according to execution of the computer program by the CPU. According to embodiments, the functions to be described with reference to FIG. 11 are performed by a dedicated hardware chip and/or the CPU.

According to embodiments, the second apparatus 40 includes a CPU, a memory, and a computer program including instructions. The computer program is stored in the memory. According to embodiments, the second apparatus 40 performs functions to be described with reference to FIG. 11 according to execution of the computer program by the CPU. According to embodiments, the functions to be described with reference to FIG. 11 are performed by a dedicated hardware chip and/or the CPU.

In FIG. 11, a configuration controller 1122 of the first apparatus 20 receives at least one input value 10. According to embodiments, the at least one input value 10 may include any one or any combination of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), and a codec type for the transformation-based encoder 1126. The at least one input value 10 may include a value pre-stored in the first apparatus 20 or a value input from a user.

The configuration controller 1122 controls operations of the AI down-scaler 1124 and the transformation-based encoder 1126, based on the received input value 10. According to embodiments, the configuration controller 1122 obtains DNN setting information for the AI down-scaler 1124 according to the received input value 10, and sets the AI down-scaler 1124 with the obtained DNN setting information. According to embodiments, the configuration controller 1122 may transmit the received input value 10 to the AI down-scaler 1124 and the AI down-scaler 1124 may obtain the DNN setting information for performing AI down-scaling on the original image 105, based on the received input value 10. According to embodiments, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to embodiments, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to any one or any combination of FIGS. 1, 7, 8, 9, and 10 to obtain the first image 115.

According to embodiments, the AI data 30 is provided to the second apparatus 40. The AI data 30 may include either one or both of resolution difference information between the original image 105 and the first image 115, and information related to the first image 115. The resolution difference information may be determined based on the target resolution difference of the input value 10, and the information related to the first image 115 may be determined based on any one or any combination of a target bitrate, the bitrate type, and the codec type. According to embodiments, the AI data 30 may include parameters used during the AI up-scaling. The AI data 30 may be provided from the AI down-scaler 1124 to the second apparatus 40.

The image data 25 is obtained as the original image 105 is processed by the transformation-based encoder 1126, and is transmitted to the second apparatus 40. The transformation-based encoder 1126 may process the first image 115 according to MPEG-2, H.264 AVC, MPEG-4, HEVC, VC-1, VP8, VP9, or VA1.

A configuration controller 1142 of the second apparatus 40 controls an operation of the AI up-scaler 1144, based on the AI data 30. According to embodiments, the configuration controller 1142 obtains the DNN setting information for the AI up-scaler 1144 according to the received AI data 30, and sets the AI up-scaler 1144 with the obtained DNN setting information. According to embodiments, the configuration controller 1142 may transmit the received AI data 30 to the AI up-scaler 1144 and the AI up-scaler 1144 may obtain the DNN setting information for performing AI up-scaling on the second image 135, based on the AI data 30. According to embodiments, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to embodiments, the AI up-scaler 1144 may receive the AI data 30 from the configuration controller 1142, receive any one or any combination of prediction mode information, motion information, and quantization parameter information from the transformation-based decoder 1146, and obtain the DNN setting information based on the AI data 30 and any one or any combination of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to embodiments, DNN setting information for the first DNN and second DNN are trained according to the training method described with reference to FIGS. 9 and 10.

Figure 12:
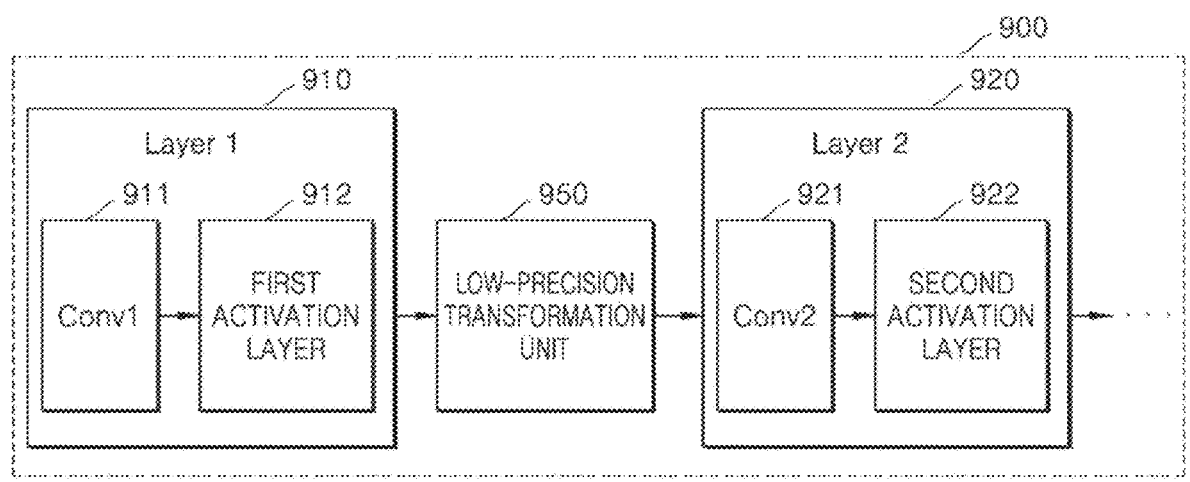
FIG. 12 is a block diagram illustrating a structure of a DNN according to embodiments of the disclosure.

FIG. 12 is a block diagram illustrating a structure of a DNN 900 according to embodiments of the disclosure.

Referring to FIG. 12, the DNN 900 may include a plurality of layers, and may further include a low-precision transformation unit between the plurality of layers.

The plurality of layers will now be described as including a first layer 910 and a second layer 920, and the second layer 920 will now be described as a layer that is next to the first layer 910. The DNN 900 may include a low-precision transformation unit 950 between the first layer 910 and the second layer 920.

FIG. 12 illustrates only two layers, but the disclosure is not limited thereto. The DNN 900 may include more layers than the two layers. For example, the DNN 900 may further include a third layer that is next to the second layer 920, and may further include a low-precision transformation unit between the second layer 920 and the third layer.

The first layer 910 and the second layer 920 may include first and second convolution layers 911 and 921, respectively, and first and second activation layers 912 and 922, respectively. The first and second convolution layers 911 and 921 may perform convolution operations between input data (image) and a filter kernel to generate feature maps, and the first and second activation layers 912 and 922 may apply activation functions to the generated feature maps.

The DNN 900 of FIG. 12 may be an example of the first DNN 700 included in the AI encoding apparatus 600 or the second DNN 300 included in the AI decoding apparatus 200. For example, the first convolution layer (Conv 1) 911 may correspond to the first convolution layer 310 of FIG. 3 and the first convolution layer 710 of FIG. 8. The second convolution layer (Conv 2) 921 may correspond to the second convolution layer 330 of FIG. 3 and the second convolution layer 730 of FIG. 8. The first activation layer 912 may correspond to the first activation layer 320 of FIG. 3 and the first activation layer 720 of FIG. 8. The second activation layer 922 may correspond to the second activation layer 340 of FIG. 3 and the second activation layer 740 of FIG. 8.

A data processing method performed by the DNN 900 according to embodiments of the disclosure will now be described with reference to FIG. 11.

The first convolution layer 911 and the first activation layer 912 included in the first layer 910 will be focused on and described.

A case in which the DNN 900 according to embodiments of the disclosure is the first DNN 700 included in the AI encoding apparatus 600 will now be described.

Figure 13:
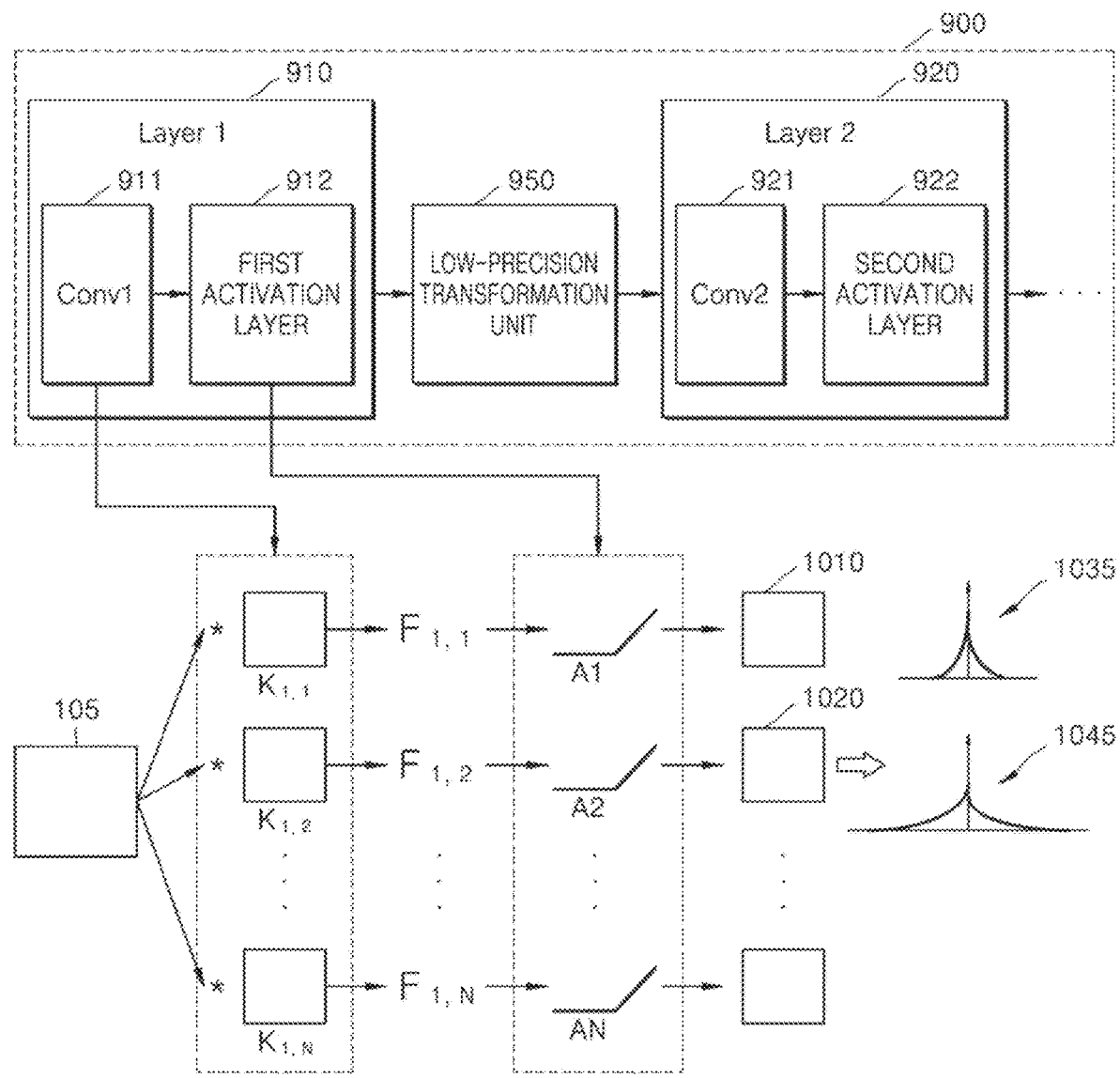
FIG. 13 is a diagram used to describe a data processing method in a first layer of FIG. 12.

FIG. 13 is a diagram used to describe a data processing method in the first layer 910 of FIG. 12.

Referring to FIG. 13, the first convolution layer 911 according to embodiments of the disclosure may include a plurality of filter kernels, namely, first, second, . . . , and N-th filter kernels, $K_{1,1}$, $K_{1,2}$, . . . , and $K_{1,N}$. The first convolution layer 911 according to embodiments of the disclosure may generate a feature map corresponding to each of the plurality of filter kernels, by performing a convolution operation between data input to the first convolution layer 911 and each of the plurality of filter kernels.

For example, when an original image 105 is input, the first convolution layer 911 may generate a first feature map $F_{1,1}$ by performing a convolution operation between the first filter kernel $K_{1,1}$ from among the plurality of filter kernels and the original image 105. When the original image 105 is input, the first convolution layer 911 may also generate a second feature map $F_{1,2}$ by performing a convolution operation between the second filter kernel $K_{1,2}$ from among the plurality of filter kernels and the original image 105.

The first activation layer 912 may apply an activation function to each of a plurality of feature maps, namely, first, second, . . . , and N-th feature maps $F_{1,1}$, $F_{1,2}$, . . . , and $F_{1,N}$, output by the first convolution layer 911. The activation function is to change values of a feature map extracted by performing a convolution operation to non-linear values such as "having or not having characteristics".

The first activation layer 912 may apply different activation functions A1, A2, . . . , and AN to the plurality of feature maps $F_{1,1}$, $F_{1,2}$, . . . , and $F_{1,N}$ output by the first convolution layer 911, respectively. This will be described in greater detail below with reference to FIG. 15.

The first activation layer 912 may obtain first result values 1010 by applying an activation function to the first feature map $F_{1,1}$. The first activation layer 912 may obtain second result values 1020 by applying an activation function to the second feature map $F_{1,2}$.

Result values obtained in the first layer 910 (for example, the first result values 1010 and the second result values 1020) are stored in memory, and the result values stored in the memory are input to a layer (for example, the second layer 920) that is next to the first layer 910. The result values obtained in the first layer 910 may be expressed as real numbers (values having high precision), and, to reduce the amount of memory that stores the result values, the low-precision transformation unit 950 may transform the result values obtained in the first layer 910 into integer values (values having low precision) having a preset range. The integer values have transformation errors.

A first graph 1035 of FIG. 13 shows a distribution of first result values, and a second graph 1045 shows a distribution of second result values. Comparing the first graph 1035 with the second graph 1045, the first result values 1010 corresponding to the first filter kernel $K_{1,1}$ and the second result values 1020 corresponding to the second filter kernel $K_{1,2}$ may have different distributions. When the first result values 1010 and the second result values 1020 having different distributions are transformed into integer values by undergoing clipping in the same range, a transformation error increases.

Accordingly, to reduce a transformation error, normalization may be performed in which different scale factors are applied to the first result values 1010 and the second result values 1020 having different distributions such that first result values 1010 and second result values 1020 to which the different scale factors have been applied, respectively, have the same or similar distributions.

Figure 14:
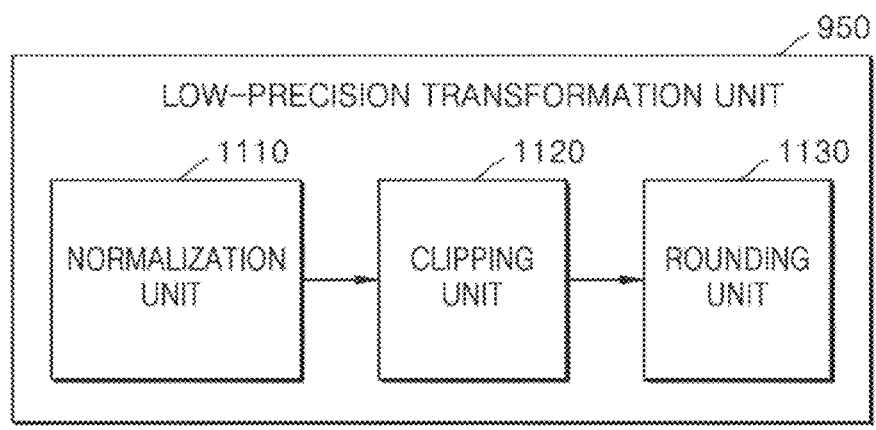
FIG. 14 is a block diagram of a structure of a low-precision transformation unit according to embodiments of the disclosure.
Figure 15:
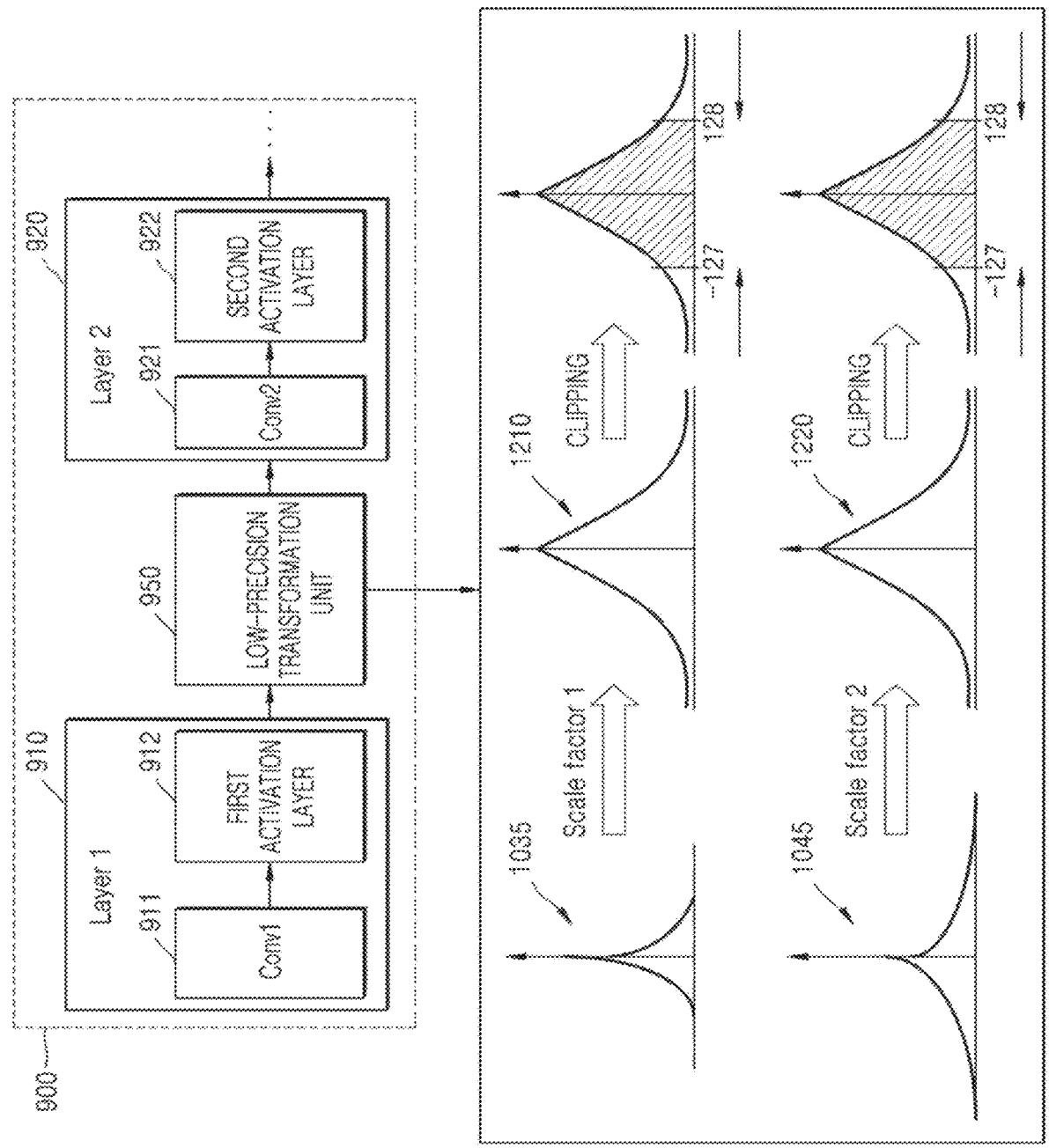
FIG. 15 is a diagram for describing a data processing method performed by a low-precision transformation unit, according to embodiments of the disclosure.

FIG. 14 is a block diagram illustrating a structure of the low-precision transformation unit 950 according to embodiments of the disclosure, and FIG. 15 is a diagram used to describe a data processing method in the low-precision transformation unit 950 according to embodiments of the disclosure.

Referring to FIG. 14, the low-precision transformation unit 950 according to embodiments of the disclosure may include a normalization unit 1110, a clipping unit 1120, and a rounding unit 1130.

The normalization unit 1110 may normalize result values obtained by the first layer 910. For example, referring to FIG. 15, the normalization unit 1110 may perform normalization by applying a first scale factor (Scale factor 1) to the first result values 1035 and may perform normalization by applying a second scale factor (Scale factor 2) to the second result values 1045, such that the first result values 1035 and the second result values 1045 have the same or similar distributions.

For example, the normalization unit 1110 may transform the first result values 1035 corresponding to the first filter kernel $F_{1,1}$ into first values 1210 by multiplying the first result values 1035 by the first scale factor, and may transform the second result values 1045 corresponding to the second filter kernel $F_{1,2}$ into second values 1220 by multiplying the second result values 1045 by the second scale factor.

The first scale factor and the second scale factor according to embodiments of the disclosure are values that are determined via training of a first DNN according to embodiments of the disclosure, and, as the first DNN and a second DNN according to embodiments of the disclosure are jointly trained, the first scale factor and the second scale factor of the first DNN are determined to be values associated with the first and the second scale factors of the second DNN. For example, during training of the first DNN and the second DNN, when first parameters of a filter kernel included in the first DNN are updated, result values obtained in each of a plurality of layers included in the first DNN are changed, and, when the result values obtained in each of the plurality of layers are changed, the scale factors of the first DNN are updated such that values to which the result values have been changed have the same or similar distributions. For example, the first scale factor and the second scale factor of the first DNN may be updated such that first values and second values obtained via the transformation by applications of the first scale factor and the second scale factor have the same normal distributions. Alternatively, the first scale factor and the second scale factor of the first DNN may be updated based on a statistical distribution of the result values obtained in each of the plurality of layers. This will be described in greater detail later with reference to FIG. 16.

When the first parameters and the scale factors of the first DNN are updated, a first training image output by the first DNN is changed. When the first training image input to the second DNN is changed, a third training image output by the second DNN is also changed. When the third training image is changed, quality loss information for training the second DNN is newly determined.

Accordingly, second parameters of a filter kernel included in the second DNN are updated in a direction of minimizing the newly-determined quality loss information. When the second parameters of the second DNN are updated, result values obtained in each of a plurality of layers included in the second DNN are changed, and, when the result values obtained in each of the plurality of layers are changed, scale factors of the second DNN that are applied such that values to which the result values have been changed have similar distributions are also updated.

When the quality loss information is newly determined, final loss information for training the first DNN is also newly determined, and the first parameters and the scale factors of the first DNN are updated in a direction of minimizing the newly-determined final loss information for training the first DNN. As such, the first parameters and the scale factors of the first DNN and the second parameters and the scale factors of the second DNN are jointly updated, and accordingly the scale factors of a training-completed first DNN and those of a training-completed second DNN have associated values.

Accordingly, DNN setting information of the first DNN (for example, the first parameters, and the number of filter kernels included in the first DNN), the scale factors of the first DNN, DNN setting information of the second DNN (for example, the second parameters, and the number of filter kernels included in the second DNN), and the scale factors of the second DNN, which are determined after completion of training, are associated with one another. Accordingly, when DNN setting information of the first DNN from among a plurality of pieces of DNN setting information of the first DNN is determined, scale factors of the first DNN corresponding to the determined DNN setting information of the first DNN may also be determined, and DNN setting information and scale factors of the second DNN corresponding to the determined DNN setting information of the first DNN may be determined.

Referring back to FIGS. 14 and 15, the clipping unit 1120 according to embodiments of the disclosure may clip the first values 1210 and the second values 1220 to a preset range. For example, the preset range may be expressed as [minimum value, maximum value]. The range to which the first values 1210 and the second values 1220 are clipped may be determined based on the number of bits used to express output values or based on an integer range. For example, when the output values are expressed in 8 bits, the 8 bits may express 256 integer values, and accordingly, the clipping range may be determined as [−127, 128]. However, this is an example, and, when the output values are desired to be expressed as 8 bits, the clipping range may be determined as various ranges including 256 integer values.

The clipping unit 1120 may transform values that are smaller than a minimum value from among the first values and the second values into the minimum value, and may transform values that are larger than a maximum value from among the first values and the second values into the maximum value.

For example, as shown in FIG. 13, when the minimum value is −127 and the maximum value is 128, the clipping unit 1120 may transform values that are smaller than −127 into −127, and may transform values that are larger than 128 into 128. Accordingly, the clipped values may be represented as real numbers that are equal to or greater than −127 and less than or equal to 128.

The rounding unit 1130 according to embodiments of the disclosure may transform the clipped (real) values into integer values within the preset range. For example, the rounding unit 1130 may transform the clipped (real) values into integer values by rounding off the clipped (real) values. Alternatively, the rounding unit 1130 may transform the clipped values into integer values by rounding up or down the clipped values. However, the disclosure is not limited thereto.

The integer values transformed in the preset range may be input to the second layer 920 that is next to the first layer 910. In the second layer 920, as in the first layer 910, a convolution operation may be performed and thus a feature map may be generated in the second convolution layer 921, and an activation function may be applied to a feature map generated in the second convolution layer 921 in the second activation layer 922.

Although the DNN 900 according to embodiments of the disclosure is a first DNN in FIGS. 13 through 15, the data processing method performed by the DNN 900 described with reference to FIGS. 13 through 15 may be equally applied to a second DNN included in the AI decoding apparatus 200.

Figure 16:
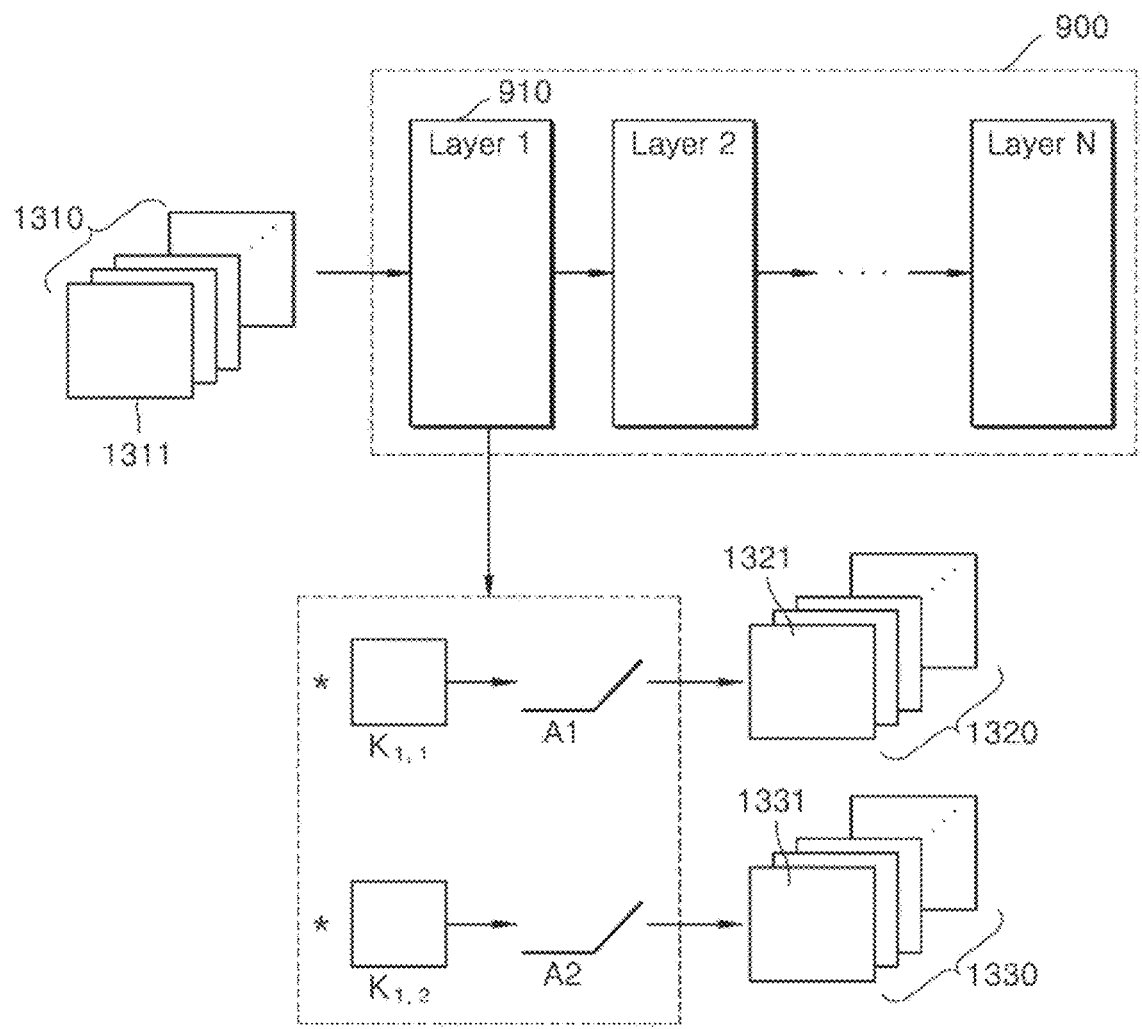
FIG. 16 is a diagram for describing a method of determining a scale factor, according to embodiments of the disclosure.

FIG. 16 is a diagram used to describe a method of determining a scale factor, according to embodiments of the disclosure.

Referring to FIG. 16, the DNN 900 according to embodiments of the disclosure may be an example of the first DNN 700 or the second DNN 300.

The DNN 900 may be trained based on a plurality of training images (training data). While the DNN 900 is being trained based on the plurality of training images, scale factors to be included in the DNN 900 may be determined. For example, when a first training image 1311 from among the plurality of training images (training data 1310) is input to the DNN 900, each of a plurality of layers included in the DNN 900 may obtain pieces of training result data respectively corresponding to a plurality of filter kernels. For example, in the first layer 910, a first feature map may be generated by performing a convolution operation between the first training image 1311 and the first filter kernel $K_{1,1}$, and first training result data 1321 may be obtained by applying the activation function A1 to the first feature map.

In the first layer 910, a second feature map may be generated by performing a convolution operation between the first training image 1311 and the second filter kernel $K_{1,2}$, and second training result data 1331 may be obtained by applying the activation function A2 to the second feature map.

When the DNN 900 is trained based on the plurality of training images and an input training image is changed, the first training result data 1321 corresponding to the first filter kernel $K_{1,1}$ of the first layer 910 is changed, and the second training result data 1331 corresponding to the second filter kernel $K_{1,2}$ of the first layer 910 is changed. Accordingly, in the first layer 910, a plurality of pieces of first training result data 1320 and a plurality of pieces of second training result data 1330, which correspond to the plurality of training images, may be obtained.

A dispersion of values included in the first training result data 1321 with respect to the first training image 1311 may be determined as an initial value of a first dispersion corresponding to the first filter kernel $K_{1,1}$, and a dispersion of values included in the second training result data 1331 with respect to the first training image 1311 may be determined as an initial value of a second dispersion corresponding to the second filter kernel $K_{1,2}$.

When the first training result data 1321 and the second training result data 1331 are changed as an input training image is changed, a dispersion of the values included in the changed first training result data may be obtained, and a first dispersion corresponding to a first filter kernel may be updated using the obtained dispersion. In addition, a dispersion of the values included in the changed second training result data may be obtained, and a second dispersion corresponding to a second filter kernel may be updated using the obtained dispersion.

A scale factor may be calculated using parameter, parameter A, and parameter B. A squared value of parameter $\sigma$ may be obtained using a sum of dispersion $\sigma_1^2$ and dispersion $\sigma_2^2$. For example, parameter $\sigma$ is calculated based on:

$$\sigma^2 = 0.99\sigma_1^2 + 0.010\sigma_2^2 \quad \text{[Equation 2]}$$

In Equation 2, $\sigma_1^2$ indicates the first dispersion corresponding to the first filter kernel $K_{1,1}$ updated during training of the DNN 900 by using previous training images, and $\sigma_2^2$ indicates the dispersion of values that are included in the first training result data 1321 corresponding to the first filter kernel $K_{1,1}$, which is obtained in the first layer 910 after a current training image is input to the DNN 900. A coefficient of 0.99 or a coefficient of 0.01 is an example, and various other constant values may be used.

Similarly, a dispersion corresponding to the second filter kernel $K_{1,2}$ of the first layer 910 may be updated, and a dispersion corresponding to each of the plurality of filter kernels included in each of the plurality of layers other than the first layer 910 may be updated.

As in Equation 3 below, a scale factor corresponding to each of a plurality of filter kernels included in the DNN 900 may be determined based on a dispersion value corresponding to each of the plurality of filter kernels.

$$\text{Scale Factor} = \frac{A}{B \times \sigma} \quad \text{[Equation 3]}$$

In Equation 3, parameter A is a value that is determined based on a preset range. For example, when the preset range is equal to or greater than −127 and less than or equal to 128, parameter A may be determined to be 128. Assuming that values included in training result data corresponding to each of the plurality of filter kernels follow a Gaussian distribution, when the probability that the values included in the training result data are included in the preset range is determined, parameter B may be determined according to the determined probability. For example, when the probability that the values included in the training result data is included in the preset range is determined to be 99.7%, parameter B may be determined to be 3. When the probability that the values included in the training result data is included in the preset range is determined to be 95.4%, parameter B may be determined to be 2. The value of parameter B may increase as the probability that the values included in the training result data is within the preset range increases. However, the disclosure is not limited thereto.

FIG. 17 illustrates an activation function according to embodiments of the disclosure.

Referring to FIG. 17, an activation function 1410 according to embodiments of the disclosure may be expressed as in Equation 4.

$$f(x) = \begin{cases} 0, & x < 0 \\ bx, & x \geq 0 \end{cases} \quad \text{[Equation 4]}$$

In Equation 4, x indicates a feature map generated as a result of a convolution operation. Slope b in a section where x is a positive number may be determined via training of the first DNN 700 and the second DNN 300 according to embodiments of the disclosure, and may have different values for different layers and different filter kernels included in the first DNN 700 and the second DNN 300. For example, slope b of a first activation function that is applied to a first feature map generated by a first filter kernel of a first layer, and slope b of a second activation function that is applied to a second feature map generated by a second filter kernel of the first layer may have different values.

An activation function 1420 according to another embodiment of the disclosure may be expressed as in Equation 5.

$$f(x) = \begin{cases} ax, & x < 0 \\ bx, & x \geq 0 \end{cases} \quad \text{[Equation 5]}$$

In Equation 5, slope a in a section where x is a negative number may be determined via training of the first DNN 700 and the second DNN 300 according to embodiments of the disclosure, or may have a fixed value. Slope b in a section where x is a positive number may be determined via training of the first DNN 700 and the second DNN 300 according to embodiments of the disclosure. Accordingly, slope b may have different values for different layers and different filter kernels included in the first DNN 700 and the second DNN 300. For example, slope b of a first activation function that is applied to a first feature map generated by a first filter kernel of a first layer, and slope b of a second activation function that is applied to a second feature map generated by a second filter kernel of the first layer may have different values.

Slope a and slope b may have different values (non-linearity), and slope a may be less than 1. However, the disclosure is not limited thereto.

Figure 18:
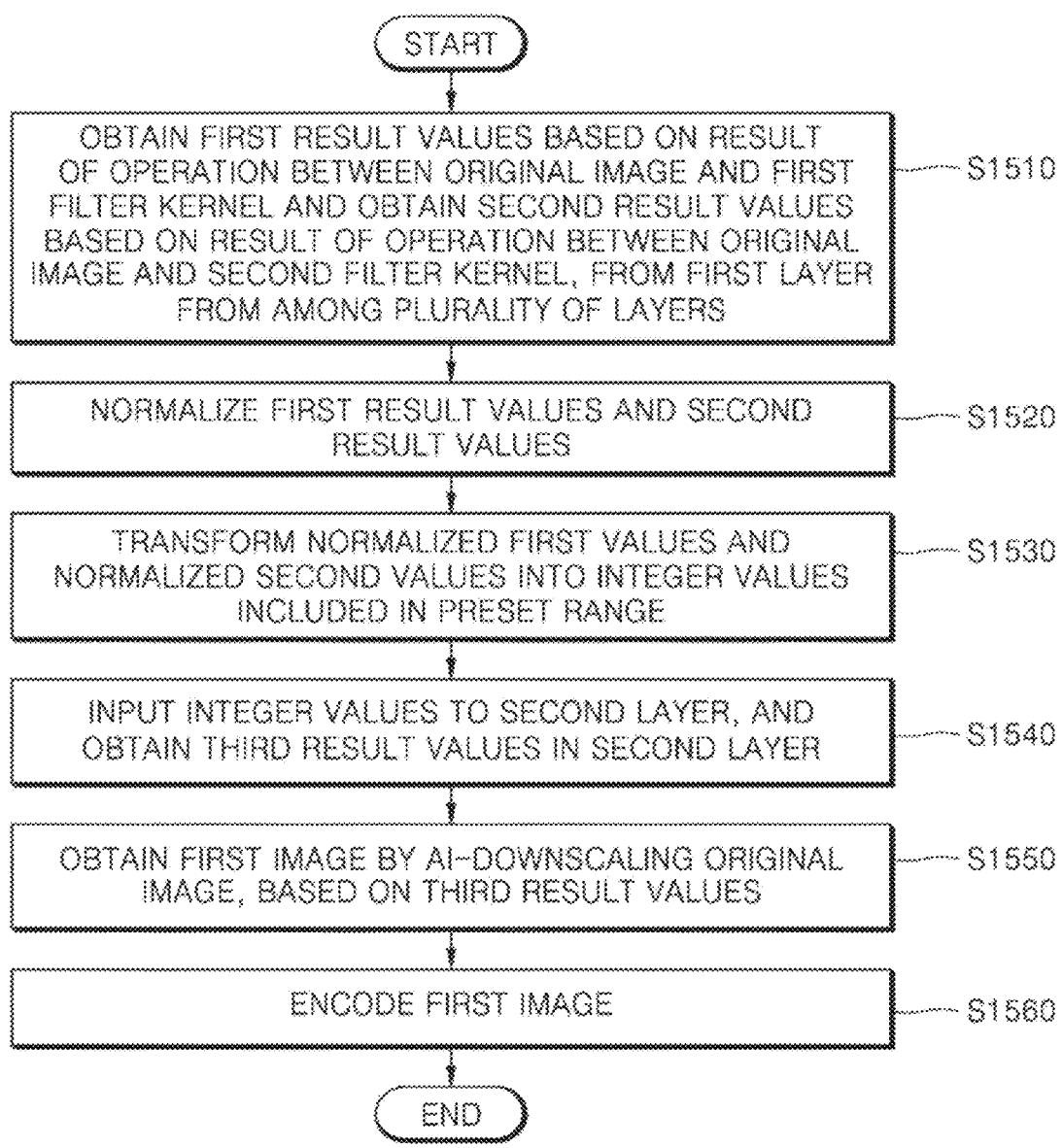
FIG. 18 is a flowchart of an operation method of an AI encoding apparatus according to embodiments of the disclosure.

FIG. 18 is a flowchart of an operation method of an AI encoding apparatus according to embodiments of the disclosure.

Referring to FIG. 18, when an original image is input to the first DNN 700 including a plurality of layers, the AI encoding apparatus 600 according to embodiments of the disclosure may obtain first result values based on a result of an operation between the original image and a first filter kernel and may obtain second result values based on a result of an operation between the original image and a second filter kernel, from a first layer from among the plurality of layers, in operation S1510.

The first DNN 700 according to embodiments of the disclosure is a network that AI-downscales an image, and thus may be a network that corresponds to the second DNN 300 that AI-upscales an image and is trained in connection with the second DNN 300. The first DNN 700 may include a plurality of layers. For example, the first DNN 700 may include a first layer and a second layer. According to embodiments of the disclosure, each of the plurality of layers may include a convolution layer and an activation layer. One convolution layer may include a plurality of filter kernels. For example, a first convolution layer included in the first layer may include a first filter kernel and a second filter kernel.

When the original image is input to the first DNN 700, in the first convolution layer of the first layer, a first feature map may be generated via a convolution operation between the original image and the first filter kernel, and a second feature map may be generated via a convolution operation between the original image and the second filter kernel.

The first feature map and the second feature map generated in the first convolution layer of the first layer may be input to a first activation layer of the first layer. In the first activation layer of the first layer, an activation function may be applied to the first feature map and thus a first result value may be output, and an activation function may be applied to the second feature map and thus a second result value may be output. Accordingly, the AI encoding apparatus 600 may obtain first result values corresponding to the first filter kernel from the first layer, and may obtain second result values corresponding to the second filter kernel from the first layer.

In operation S1520, the AI encoding apparatus 600 may normalize the first result values and the second result values. For example, the AI encoding apparatus 600 may perform normalization by applying a first scale factor to the first result values, and may perform normalization by applying a second scale factor to the second result values. For example, the AI encoding apparatus 600 may transform the first result values into first values by multiplying the first result values by the first scale factor, and may transform the second result values into second values by multiplying the second result values by the second scale factor.

The first scale factor and the second scale factor according to embodiments of the disclosure are values that are determined by training of the first DNN, and, as the first DNN and the second DNN according to embodiments of the disclosure are trained in connection with each other, the first scale factor and the second scale factor of the first DNN are determined to be values associated with the scale factors of the second DNN. For example, during training of the first DNN and the second DNN, when first parameters of a filter kernel included in the first DNN are updated, result values obtained in each of the plurality of layers included in the first DNN are changed, and, when the result values obtained in each of the plurality of layers are changed, the scale factors of the first DNN are updated such that values to which the result values have been changed have the same or similar distributions. For example, the first scale factor and the second scale factor of the first DNN may be updated such that first values and second values obtained via the transformation by applications of the first scale factor and the second scale factor have the same normal distributions. Alternatively, the first scale factor and the second scale factor of the first DNN may be updated based on a statistical distribution of the result values obtained in each of the plurality of layers.

When the first parameters and the scale factors of the first DNN are updated, a first training image output by the first DNN is changed. When the first training image input to the second DNN is changed, a third training image output by the second DNN is also changed. When the third training image is changed, quality loss information for training the second DNN is newly determined.

Accordingly, second parameters of a filter kernel included in the second DNN are updated in a direction of minimizing the newly-determined third loss information. When the second parameters of the second DNN are updated, result values obtained in each of the plurality of layers included in the second DNN are changed, and, when the result values obtained in each of the plurality of layers are changed, scale factors of the second DNN that are applied such that values to which the result values have been changed have similar distributions are updated.

When the quality loss information is newly determined, final loss information for training the first DNN is also newly determined, and the first parameters and the scale factors of the first DNN are updated in a direction of minimizing the newly-determined final loss information for training the first DNN. As such, the first parameters and the scale factors of the first DNN and the second parameters and the scale factors of the second DNN are updated in connection with each other, and accordingly the scale factors of a training-completed first DNN and those of a training-completed second DNN have associated values.

Accordingly, DNN setting information of the first DNN (for example, the first parameters, and the number of filter kernels included in the first DNN), the scale factors of the first DNN, DNN setting information of the second DNN (for example, the second parameters, and the number of filter kernels included in the second DNN), and the scale factors of the second DNN, which are determined after completion of training, are associated with one another. Accordingly, when DNN setting information of the first DNN from among a plurality of pieces of DNN setting information of the first DNN is determined, scale factors of the first DNN corresponding to the determined DNN setting information of the first DNN may also be determined, and DNN setting information and scale factors of the second DNN corresponding to the determined DNN setting information of the first DNN may be determined.

In operation S1530, the AI encoding apparatus 600 may transform the normalized first values and the normalized second values into integer values included in a preset range.

For example, the AI encoding apparatus 600 may clip the first values and the second values to the preset range. The range to which the first values and the second values are clipped may be determined based on the number of bits used to express output values or based on an integer range. When the clipping range is [minimum value, maximum value], the AI encoding apparatus 600 may transform values that are smaller than a minimum value from among the first values and the second values into the minimum value, and may transform values that are larger than a maximum value from among the first values and the second values into the maximum value.

The AI encoding apparatus 600 may transform the clipped values into integer values by rounding off the clipped values. Alternatively, the AI encoding apparatus 600 may transform the clipped values into integer values by rounding up or down the clipped values. The integer values may be input to a second layer that is next to the first layer.

In operation S1540, when the integer values are input to the second layer, in the same manner as in the first layer, in a second convolution layer of the second layer, a plurality of feature maps may be generated via a convolution operation between the input integer values and a plurality of filter kernels, and, in a second activation layer of the second layer, third result values may be obtained by applying an activation function to each of the plurality of feature maps. The AI encoding apparatus 600 may perform low-precision transformation to transform the third result values into integer values in a preset range, by performing normalization and clipping with respect to the third result values, and may input the integer values to a next layer.

As such, a process may be repeatedly performed, in which the original image undergoes a convolution operation and an activation function operation with filter kernels in each of a plurality of layers included in the first DNN 700 while passing through the plurality of layers and thus result values are output, and, low-precision transformation is performed on the result values output by each layer, and a result of the low-precision transformation is input to a next layer. Accordingly, in operation S1550, the AI encoding apparatus 600 may obtain the first image 115 by AI-downscaling the original image, by using the first DNN 700. At this time, the integer values obtained via low-precision transformation on the result values output by each layer of the first DNN may be stored in memory before being input to a next layer, and thus the amount of memory necessary for storing intermediate result values generated while obtaining a first image (an image obtained by AI-downscaling the original image) by using the first DNN 700 may be reduced.

In operation S1560, the AI encoding apparatus 600 may encode the first image.

Figure 19:
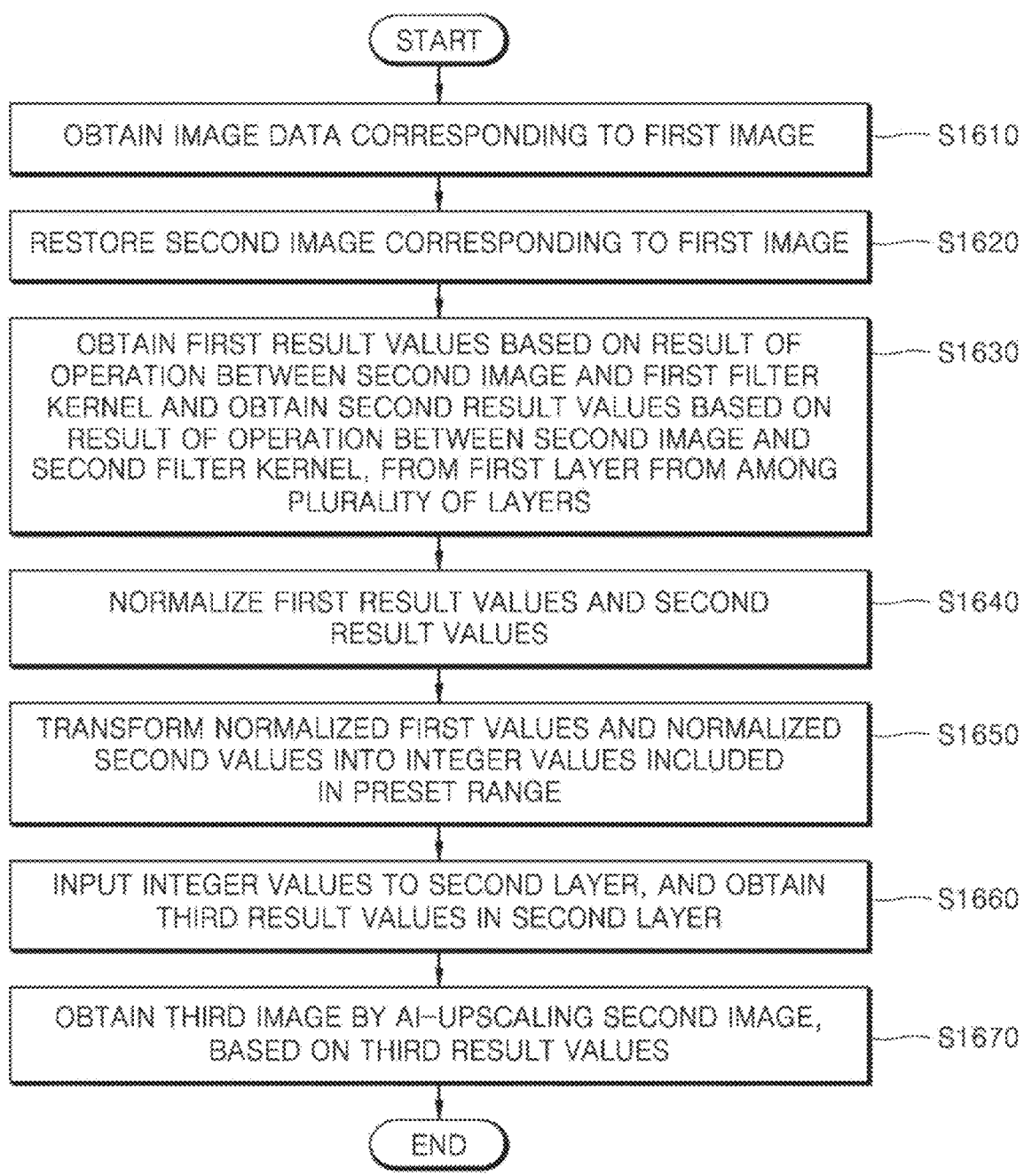
FIG. 19 is a flowchart of an operation method of an AI decoding apparatus according to embodiments of the disclosure.

FIG. 19 is a flowchart of an operation method of an AI decoding apparatus according to embodiments of the disclosure.

Referring to FIG. 19, in operation S1610, the AI decoding apparatus 200 may obtain image data corresponding to a first image.

The first image may be an image obtained by AI-downscaling an original image by using the first DNN 700, and the image data may include image data generated by AI-encoding the first image.

In operation S1620, the AI decoding apparatus 200 may restore a second image corresponding to the first image, based on the image data.

In operation S1630, when the second image is input to the second DNN 300 including a plurality of layers, the AI decoding apparatus 200 may obtain first result values based on a result of an operation between the second image and a first filter kernel and may obtain second result values based on a result of an operation between the second image and a second filter kernel, from a first layer from among the plurality of layers.

The second DNN 300 according to embodiments of the disclosure is a network that AI-upscales an image, and thus may be a network that corresponds to the first DNN 700 AI-downscaling an image and is trained in connection with the first DNN 700. The second DNN 300 may include a plurality of layers. For example, the second DNN 300 may include a first layer and a second layer. According to embodiments of the disclosure, each of the plurality of layers may include a convolution layer and an activation layer. One convolution layer may include a plurality of filter kernels. For example, a first convolution layer included in the first layer may include a first filter kernel and a second filter kernel.

When the second image is input to the second DNN 300, in a first convolution layer of the first layer, a first feature map may be generated via a convolution operation between the second image and the first filter kernel, and a second feature map may be generated via a convolution operation between the second image and the second filter kernel.

The first feature map and the second feature map generated in the first convolution layer of the first layer may be input to a first activation layer of the first layer. In the first activation layer of the first layer, an activation function may be applied to the first feature map and thus a first result value may be output, and an activation function may be applied to the second feature map and thus a second result value may be output. Accordingly, the AI decoding apparatus 200 may obtain first result values corresponding to the first filter kernel from the first layer, and may obtain second result values corresponding to the second filter kernel from the first layer.

In operation S1640, the AI decoding apparatus 200 may normalize the first result values and the second result values. For example, the AI decoding apparatus 200 may perform normalization by applying a first scale factor to the first result values, and may perform normalization by applying a second scale factor to the second result values. For example, the AI decoding apparatus 200 may transform the first result values into first values by multiplying the first result values by the first scale factor, and may transform the second result values into second values by multiplying the second result values by the second scale factor.

The first scale factor and the second scale factor according to embodiments of the disclosure are values that are determined by training of the first DNN, and, as the first DNN and the second DNN according to embodiments of the disclosure are trained in connection with each other, the first scale factor and the second scale factor of the first DNN are determined to be values associated with the scale factors of the second DNN. For example, during training of the first DNN and the second DNN, when first parameters of a filter kernel included in the first DNN are updated, result values obtained in each of the plurality of layers included in the first DNN are changed, and, when the result values obtained in each of the plurality of layers are changed, the scale factors of the first DNN are updated such that values to which the result values have been changed have the same or similar distributions. For example, the first scale factor and the second scale factor of the first DNN may be updated such that first values and second values obtained via the transformation by applications of the first scale factor and the second scale factor have the same normal distributions. Alternatively, the first scale factor and the second scale factor of the first DNN may be updated based on a statistical distribution of the result values obtained in each of the plurality of layers.

When the first parameters and the scale factors of the first DNN are updated, a first training image output by the first DNN is changed. When the first training image input to the second DNN is changed, a third training image output by the second DNN is also changed. When the third training image is changed, quality loss information for training the second DNN is newly determined.

Accordingly, second parameters of a filter kernel included in the second DNN are updated in a direction of minimizing the newly-determined quality loss information. When the second parameters of the second DNN are updated, result values obtained in each of the plurality of layers included in the second DNN are changed, and, when the result values obtained in each of the plurality of layers are changed, scale factors of the second DNN that are applied are updated such that the changed result values have the same or similar distributions.

When the quality loss information is newly determined, final loss information for training the first DNN is also newly determined, and the first parameters and the scale factors of the first DNN are updated in a direction of minimizing the newly-determined final loss information for training the first DNN. As such, the first parameters and the scale factors of the first DNN and the second parameters and the scale factors of the second DNN are updated in connection with each other, and accordingly the scale factors of a training-completed first DNN and those of a training-completed second DNN have associated values.

Accordingly, DNN setting information of the first DNN (for example, the first parameters, and the number of filter kernels included in the first DNN), the scale factors of the first DNN, DNN setting information of the second DNN (for example, the second parameters, and the number of filter kernels included in the second DNN), and the scale factors of the second DNN, which are determined after completion of training, are associated with one another. Accordingly, when DNN setting information of the first DNN from among a plurality of pieces of DNN setting information of the first DNN is determined, scale factors of the first DNN corresponding to the determined DNN setting information of the first DNN may also be determined, and DNN setting information and scale factors of the second DNN corresponding to the determined DNN setting information of the first DNN may be determined.

In operation S1650, the AI decoding apparatus 200 may transform the normalized first values and the normalized second values into integer values included in a preset range.

For example, the AI decoding apparatus 200 may clip the first values and the second values to the preset range. The range to which the first values and the second values are clipped may be determined based on the number of bits used to express output values or based on an integer range. When the clipping range is [minimum value, maximum value], the AI decoding apparatus 200 may transform values that are smaller than a minimum value from among the first values and the second values into the minimum value, and may transform values that are larger than a maximum value from among the first values and the second values into the maximum value.

The AI decoding apparatus 200 may transform the clipped values into integer values by rounding off the clipped values. Alternatively, the AI decoding apparatus 200 may transform the clipped values into integer values by rounding up or down the clipped values. The integer values may be input to a second layer that is next to the first layer.

In operation S1660, when the integer values are input to the second layer, in the same manner as in the first layer, in a second convolution layer of the second layer, a plurality of feature maps may be generated via a convolution operation between the input integer values and a plurality of filter kernels, and, in a second activation layer of the second layer, third result values may be obtained by applying an activation function to each of the plurality of feature maps. The AI decoding apparatus 200 may perform low-precision transformation to transform the third result values into integer values in a preset range, by performing normalization and clipping with respect to the third result values, and may input the integer values to a next layer.

As such, a process may be repeatedly performed, in which the second image undergoes a convolution operation and an activation function operation with filter kernels in each of a plurality of layers included in the second DNN 300 while passing through the plurality of layers and thus result values are output, and, low-precision transformation is performed on the result values output by each layer, and a result of the low-precision transformation is input to a next layer. Accordingly, in operation S1670, the AI decoding apparatus 200 may obtain a third image by AI-upscaling the second image, by using the second DNN 300.

At this time, the integer values obtained via low-precision transformation on the result values output by each layer of the second DNN may be stored in memory before being input to a next layer, and thus the amount of memory necessary for storing intermediate result values generated while obtaining the third image (an image obtained by AI-downscaling the second image) by using the second DNN 300 may be reduced.

Figure 20:
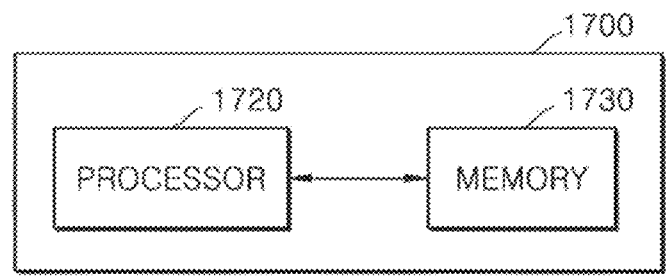
FIG. 20 is a block diagram of a structure of an AI encoding apparatus according to embodiments of the disclosure.

FIG. 20 is a block diagram of a structure of an AI encoding apparatus 1700 according to embodiments of the disclosure.

The AI encoding apparatus 1700 of FIG. 20 may be embodiments of the AI encoding apparatus 600 of FIG. 7. Referring to FIG. 20, the AI encoding apparatus 1700 may include a processor 1720 and a memory 1730.

The processor 1720 according to embodiments of the disclosure may entirely control the AI encoding apparatus 1700. The processor 1720 according to embodiments of the disclosure may execute one or more programs stored in the memory 1730.

The memory 1730 according to embodiments of the disclosure may store various pieces of data, programs, or applications for driving and controlling the AI encoding apparatus 1700. A program stored in the memory 1730 may include at least one instruction. A program (one or more instructions) or application stored in the memory 1730 may be executed by the processor 1720.

The processor 1720 according to embodiments of the disclosure may perform at least one of operations of the AI encoding unit 610 and the transmission unit 630 illustrated in and described above with reference to FIG. 7, operations of the first and second convolution layers 911 and 921, the first and second activation layers 912 and 922, and the low-precision transformation unit 950 illustrated in and described above with reference to FIGS. 12 through 15, and operations of the AI encoding apparatus 600 described above with reference to FIG. 18.

When an original image is input to a first DNN including a plurality of layers, the processor 1720 according to embodiments of the disclosure may obtain first result values based on a result of an operation between the original image and a first filter kernel and may obtain second result values based on a result of an operation between the original image and a second filter kernel, from a first layer from among the plurality of layers. For example, the processor 1720 may generate a first feature map via a convolution operation between the original image and the first filter kernel, and may obtain first result values by applying an activation function to the first feature map, in a first convolution layer of the first layer. The processor 1720 may also generate a second feature map via a convolution operation between the original image and the second filter kernel, and may also obtain second result values by applying an activation function to the second feature map, in the first convolution layer of the first layer. The activation function (first activation function) applied to the first feature map and the activation function (second activation function) applied to the second feature map may be activation functions having the form of Equation 4 or 5, as described above with reference to FIG. 17, and slopes a or b of the first activation function and the second activation function may be different from each other.

The processor 1720 may perform normalization by applying a first scale factor to the first result values, and may perform normalization by applying a second scale factor to the second result values. The processor 1720 may clip normalized values to a preset range and transform the clipped values into integer values. The processor 1720 may transform the clipped values into the integer values by rounding off, up, or down the clipped values, but the disclosure is not limited thereto.

The processor 1720 may input the integer values to a second layer that is next to the first layer.

As such, a process may be repeatedly performed, in which the original image undergoes a convolution operation and an activation function operation with filter kernels in each of a plurality of layers included in the first DNN 700 while passing through the plurality of layers, low-precision transformation is performed on result values output by each layer, and a result of the low-precision transformation is input to a next layer. Accordingly, the processor 1720 may obtain the first image 115 by AI-downscaling the original image, by using the first DNN 700.

Any one or any combination of a convolution layer, an activation layer, or a low-precision transformation unit included in the first DNN 700 may be manufactured in the form of a hardware chip and may be mounted on the AI encoding apparatus 1700. For example, any one or any combination of the convolution layer, the activation layer, or the low-precision transformation unit included in the first DNN 700 may be manufactured in the form of a dedicated hardware chip for artificial intelligence (AI), or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various image processing apparatuses.

Any one or any combination of the convolution layer, the activation layer, an the low-precision transformation unit included in the first DNN 700 may be implemented using a software module. When any one or any combination of the convolution layer, the activation layer, or the low-precision transformation unit included in the first DNN 700 is implemented using a software module (or a program module including instructions), the software module may be stored in non-transitory computer readable media. In this case, the at least one software module may be provided by an operating system (OS) or by a certain application. Alternatively, some of the at least one software module may be provided by an OS and the others may be provided by a certain application.

Figure 21:
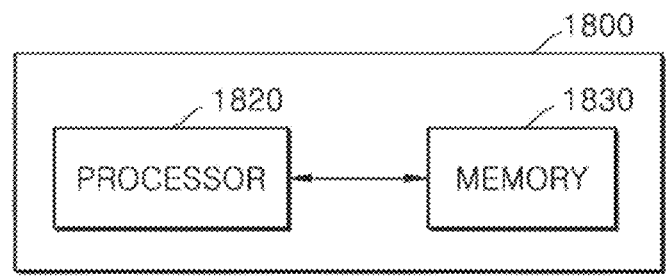
FIG. 21 is a block diagram of a structure of an AI decoding apparatus according to embodiments of the disclosure.

FIG. 21 is a block diagram of a structure of an AI decoding apparatus 1800 according to embodiments of the disclosure.

The AI decoding apparatus 1800 of FIG. 21 may be embodiments of the AI decoding apparatus 200 of FIG. 2. Referring to FIG. 21, the AI decoding apparatus 1800 may include a processor 1820 and a memory 1830.

The processor 1820 according to embodiments of the disclosure may entirely control the AI decoding apparatus 1800. The processor 1820 according to embodiments of the disclosure may execute one or more programs stored in the memory 1830.

The memory 1830 according to embodiments of the disclosure may store various pieces of data, programs, or applications for driving and controlling the AI decoding apparatus 1800. A program stored in the memory 1830 may include at least one instruction. A program (one or more instructions) or application stored in the memory 1830 may be executed by the processor 1820.

The processor 1820 according to embodiments of the disclosure may perform either one or both of operations of the receiving unit 210 and the AI decoding unit 230 illustrated in and described above with reference to FIG. 2, operations of the first and second convolution layers 911 and 921, the first and second activation layers 912 and 922, and the low-precision transformation unit 950 illustrated in and described above with reference to FIGS. 12 through 15, and operations of the AI decoding apparatus 200 described above with reference to FIG. 21.

When a second image is input to a second DNN including a plurality of layers, the processor 1820 according to embodiments of the disclosure may obtain first result values based on a result of an operation between the second image and a first filter kernel and may obtain second result values based on a result of an operation between the second image and a second filter kernel, from a first layer from among the plurality of layers. For example, the processor 1820 may generate a first feature map via a convolution operation between the second image and the first filter kernel, and may obtain first result values by applying an activation function to the first feature map, in a first convolution layer of the first layer. The processor 1820 may also generate a second feature map via a convolution operation between the second image and the second filter kernel, and may also obtain second result values by applying an activation function to the second feature map, in the first convolution layer of the first layer. The activation function (first activation function) applied to the first feature map and the activation function (second activation function) applied to the second feature map may be activation functions having the form of Equation 4 or 5, as described above with reference to FIG. 17, and slopes a or b of the first activation function and the second activation function may be different from each other.

The processor 1820 may perform normalization by applying a first scale factor to the first result values, and may perform normalization by applying a second scale factor to the second result values. The processor 1820 may clip normalized values to a preset range and transform the clipped values into integer values. The processor 1820 may transform the clipped values into the integer values by rounding off, up, or down the clipped values, but the disclosure is not limited thereto.

The processor 1820 may input the integer values to a second layer that is next to the first layer.

As such, a process may be repeatedly performed, in which the second image undergoes a convolution operation and an activation function operation with filter kernels in each of a plurality of layers included in the second DNN 300 while passing through the plurality of layers, low-precision transformation is performed on result values output by each layer, and a result of the low-precision transformation is input to a next layer. Accordingly, the processor 1820 may obtain a third image by AI-upscaling the second image, by using the second DNN 300.

Any one or any combination of a convolution layer, an activation layer, or a low-precision transformation unit included in the second DNN 300 may be manufactured in the form of a hardware chip and may be mounted on the AI decoding apparatus 1800. For example, at least one of the convolution layer, the activation layer, or the low-precision transformation unit included in the second DNN 300 may be manufactured in the form of a dedicated hardware chip for artificial intelligence (AI), or may be manufactured as a portion of an existing general-purpose processor (for example, a central processing unit (CPU) or an application processor (AP)) or a processor dedicated to graphics (for example, a graphics processing unit (GPU)) and may be mounted on any of the aforementioned various image processing apparatuses.

Any one or any combination of the convolution layer, the activation layer, and the low-precision transformation unit included in the second DNN 300 may be implemented using a software module. When any one or any combination of the convolution layer, the activation layer, and the low-precision transformation unit included in the second DNN 300 is implemented using a software module (or a program module including instructions), the software module may be stored in non-transitory computer readable media. In this case, the at least one software module may be provided by an OS or by a certain application. Alternatively, some of the at least one software module may be provided by an OS and the others may be provided by a certain application.

The block diagrams of the AI encoding apparatus 1700 and the AI decoding apparatus 1800 shown in FIGS. 20 and 21 are only exemplary embodiments of the disclosure. Components illustrated in FIGS. 20 and 21 may be combined or omitted according to the specifications of the AI encoding apparatus 1700 and the AI decoding apparatus 1800 when being actually implemented, or additional components may be included in the block diagrams of FIGS. 20 and 21. In other words, two or more components may be combined into a single component, or a single component may be divided into two or more components. A function performed in each block is merely an example to explain embodiments of the disclosure, and a detailed operation or device of each block does not limit the scope of the embodiments of the disclosure.

An AI encoding apparatus according to embodiments of the disclosure may reduce the amount of necessary memory by expressing, with low precision, intermediate result values generated during down-scaling of an image by using a first DNN, and may improve the performance of the first DNN by minimizing a transformation error during transformation of the intermediate result values into low-precision values.

The AI encoding apparatus according to embodiments of the disclosure may also improve the performance of the first DNN by applying a trainable activation function to the first DNN.

An AI decoding apparatus according to embodiments of the disclosure may reduce the amount of necessary memory by expressing, with low precision, intermediate result values generated during up-scaling of an image by using a second DNN, and may improve the performance of the second DNN by minimizing a transformation error during transformation of the intermediate result values into low-precision values.

In a system in which an AI encoding apparatus includes a server that provides an AI downscaled image and an AI decoding apparatus includes a terminal that receives the AI downscaled image, the amount of memory necessary for storing intermediate result values generated during AI upscaling of an image received from the terminal may be reduced, leading to an improvement in the efficiency of the system.

An AI decoding apparatus according to embodiments of the disclosure may improve the performance of the second DNN by applying a trainable activation function to the second DNN.

Meanwhile, the embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN described above may be implemented via a software module. When the DNN model is implemented via a software module (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of an dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device for displaying an image by using an artificial intelligence (AI), the electronic device comprising:
    a display; and
    one or more processors configured to:
        obtain AI data related to AI down-scaling an original image to a first image, the AI data comprising information related to the first image,
        obtain image data corresponding to an encoding result on the first image,
        obtain a second image by decoding the obtained image data,
        select neural network (NN) setting information from a plurality of NN setting information that is pre-stored in the electronic device, the NN setting information corresponding to at least a portion of the obtained AI data, and the NN setting information being for performing AI up-scaling on the obtained second image;
        input the second image to an up-scaling NN comprising a plurality of layers comprising a first layer and a second layer, the first layer comprising a first filter kernel and a second filter kernel, the up-scaling NN being set with the selected NN setting information,
        obtain first result values based on an operation between the second image and the first filter kernel, and obtain second result values based on an operation between the second image and the second filter kernel,
        perform normalization by transforming the first result values into first values by using a first scale factor, and perform normalization by transforming the second result values into second values by using a second scale factor,
        transform the first values into first integer values included in a preset range and transform the second values into second integer values included in the preset range,
        input the first and second integer values to the second layer,
        obtain third result values based on the first and second integer values in the second layer, and obtain a third image by up-scaling the second image, based on the third result values, and provide, on the display of the electronic device, the obtained third image,
wherein the first scale factor and the second scale factor are set in association with scale factors of a down-scaling NN.

2. The electronic device claim 1, wherein the up-scaling NN is a network trained in connection with the down-scaling NN, based on an image obtained during training of the down-scaling NN, and
the first scale factor and the second scale factor are set via training of the up-scaling NN and the down-scaling NN.

3. The electronic device of claim 1, wherein the first scale factor and the second scale factor are trained such that a normal distribution of the first values becomes equal to a normal distribution of the second values.

4. The electronic device of claim 1, wherein the one or more processors are further configured to execute the one or more instructions to clip the first values and the second values in the preset range and transform the clipped first values into the first integer values and transform the clipped second values into the second integer values.

5. The electronic device of claim 4, wherein the one or more processors are further configured to transform the clipped first values into the first integer values and transform the clipped second values into the second integer values, by rounding off the clipped first and second values.

6. The electronic device of claim 1, wherein the one or more processors are further configured to store the first and second integer values in a memory.

7. The electronic device of claim 6, wherein a size of the memory that stores the first and second integer values is determined based on the preset range.

8. The electronic device of claim 1, wherein the one or more processors are further configured to:
generate a first feature map by performing a convolution operation between the second image and the first filter kernel, and obtain the first result values by applying a first activation function to the first feature map, and
generate a second feature map by performing a convolution operation between the second image and the second filter kernel, and obtain the second result values by applying a second activation function to the second feature map.

9. The electronic device of claim 8, wherein
the first activation function and the second activation function are expressed as $$f(x) = \begin{cases} ax, & x < 0 \\ bx, & x \geq 0, \end{cases}$$

wherein f(x) denotes the first activation function or the second activation function, a and b denote slopes that have different values, and
wherein a value of b is determined via training of the up-scaling NN.

10. The electronic device of claim 9, wherein the value of b in the first activation function is different from the value of b in the second activation function.

11. A server for providing an image by using an artificial intelligence (AI) comprising:
a memory storing one or more instructions; and
one or more processors configured to execute the stored one or more instructions to:
select neural network (NN) setting information from a plurality of NN setting information that is pre-stored in the server,
input an original image to a down-scaling NN comprising a plurality of layers comprising a first layer and a second layer, the first layer comprising a first filter kernel and a second filter kernel, the down-scaling NN being set with the selected NN setting information,
obtain first result values based on an operation between the original image and the first filter kernel, and obtain second result values based on an operation between the original image and the second filter kernel,
perform normalization by transforming the first result values into first values by using a first scale factor, and perform normalization by transforming the second result values into second values by using a second scale factor,
transform the first values into first integer values included in a preset range and transform the second values into second integer values included in the preset range,
input the first and second integer values to the second layer, and obtain third result values based on the first and second integer values in the second layer,
obtain a first image by downscaling the original image, based on the third result values,
encode the first image to obtain image data, and
provide an electronic device with the image data and AI data related to the AI down-scaling, the AI data being used to select NN setting information from a plurality of NN setting information that is pre-stored in the electronic device,
wherein the first scale factor and the second scale factor are set in association with scale factors of an up-scaling NN that is configured to upscale the first image.

12. The server of claim 11, wherein
the down-scaling NN is a network trained in connection with the up scaling NN, based on loss information that is obtained during training of the up scaling NN, and
the first scale factor and the second scale factor are set via training of the up scaling NN and the down-scaling NN.

13. The server of claim 12, wherein the down-scaling NN is a network trained based on first loss information generated by AI downscaling during training of the down-scaling NN and second loss information generated by AI upscaling during training of the up scaling NN.

14. The server of claim 11, wherein the first scale factor and the second scale factor are trained such that a normal distribution of the first values becomes equal to a normal distribution of the second values.

15. The server of claim 11, wherein the one or more processors are further configured to execute the one or more instructions to clip the first values and the second values in the preset range and transform the clipped first values into the first integer values and transform the clipped second values into the second integer values.

16. The server of claim 15, wherein the one or more processors are further configured to execute the one or more instructions to transform the clipped first values into the first integer values and transform the clipped second values into the second integer values, by rounding off the clipped first and second values.

17. The server of claim 11, wherein the one or more processors are further configured to execute the one or more instructions to store the first and second integer values in the memory.

18. The server of claim 17, wherein a size of the memory that stores the first and second integer values is determined based on the preset range.

19. The server of claim 11, wherein the one or more processors are further configured to execute the one or more instructions to:
generate a first feature map by performing a convolution operation between the original image and the first filter kernel, and obtain the first result values by applying a first activation to the first feature map, and
generate a second feature map by performing a convolution operation between the original image and the second filter kernel, and obtain the second result values by applying a second activation function to the second feature map.

20. The server of claim 19, wherein
the first activation function and the second activation function are expressed as $$f(x) = \begin{cases} ax, & x < 0 \\ bx, & x \geq 0, \end{cases}$$

wherein f(x) denotes the first activation function or the second activation function, a and b denote slopes that have different values, and
wherein a value of b is determined via training of the first DNN.

21. The server of claim 20, wherein the value of b in the first activation function is different from the value of b in the second activation function.

22. An operation method of an electronic device for displaying an image by using an artificial intelligence (AI), the operation method comprising:
obtaining AI data related to AI down-scaling an original image to a first image, the AI data comprising information related to the first image;
obtaining image data corresponding to an encoding result of the first image;
obtaining a second image by decoding the obtained image data;
selecting neural network (NN) setting information from a plurality of NN setting information that is pre-stored in the electronic device, the NN setting information corresponding to at least a portion of the obtained AI data, and the NN setting information being for performing AI up-scaling on the obtained second image;
inputting the second image to an up-scaling NN comprising a plurality of layers comprising a first layer and a second layer, the first layer comprising a first filter kernel and a second filter kernel, the up-scaling NN being set with the selected NN setting information;
obtaining first result values based on an operation between the second image and the first filter kernel, and obtaining second result values based on an operation between the second image and the second filter kernel;
performing normalization by transforming the first result values into first values by using a first scale factor, and performing normalization by transforming the second result values into second values by using a second scale factor;
transforming the first values into first integer values included in a preset range and transforming the second values into second integer values included in the preset range;
inputting the first and second integer values to the second layer, and obtaining third result values based on the first and second integer values in the second layer;
obtaining a third image by upscaling the second image, based on the third result values; and
providing, on the display of the electronic device, the obtained third image,
wherein the first scale factor and the second scale factor are set in association with scale factors of a down-scaling NN.

23. The operation method of the claim 22, wherein the up scaling NN is a network trained in connection with the down-scaling NN, based on an image obtained during training of the down-scaling NN, and
the first scale factor and the second scale factor are set via training of the up scaling NN and the down-scaling NN.

24. The operation method of the claim 22, wherein the first scale factor and the second scale factor are trained such that a normal distribution of the first values becomes equal to a normal distribution of the second values.

25. The operation method of the claim 22, wherein the transforming the first values and the second values into integer values comprises clipping the first values and the second values in the preset range, and transforming the clipped first values into the first integer values and transforming the clipped second values into the second integer values.

26. The operation method of the claim 25, wherein the transforming the clipped first values into the first integer values and transforming the clipped second values into the second integer values comprises transforming the clipped first values into the first integer values and transforming the clipped second values into the second integer values, by rounding off the clipped first and second values.

27. The operation method of the claim 22, the operation method further comprises storing the first and second integer values in a memory.

28. An operation method of a server for providing an image by using an artificial intelligence (AI), the operation method comprising:
selecting neural network (NN) setting information from a plurality of NN setting information that is pre-stored in the server;
inputting an original image to a down-scaling NN comprising a plurality of layers comprising a first layer and a second layer, the first layer comprising a first filter kernel and a second filter kernel, the down-scaling NN being set with the selected NN setting information;
obtaining first result values based on an operation between the original image and the first filter kernel and obtaining second result values based on an operation between the original image and the second filter kernel;
performing normalization by transforming the first result values into first values by using a first scale factor, and performing normalization by transforming the second result values into second values by using a second scale factor;
transforming the first values into first integer values included in a preset range and transforming the second values into second integer values included in the preset range;
inputting the first and second integer values to the second layer, and obtaining third result values based on the first and second integer values in the second layer;
obtaining a first image by downscaling the original image, based on the third result values;
encoding the first image to obtain image data; and providing an electronic device with the image data and AI data related to the AI down- scaling, the AI data being used to select NN setting information from a plurality of NN setting information that is pre-stored in the electronic device, wherein the first scale factor and the second scale factor are set in association with scale factors of an up-scaling NN that is configured to upscale the first image.

29. The operation method of the server of claim 28, wherein the down-scaling NN is a network trained in connection with the up scaling NN, based on loss information that is obtained during training of the up scaling NN, and the first scale factor and the second scale factor are set via training of the up scaling NN and the down-scaling NN.

30. The operation method of the server of claim 29, wherein the down-scaling NN is a network trained based on first loss information generated by AI downscaling during training of the down-scaling NN and second loss information generated by AI upscaling during training of the up scaling NN.

\* \* \* \* \*